US011401195B2

(12) United States Patent
Stute

(10) Patent No.: US 11,401,195 B2
(45) Date of Patent: Aug. 2, 2022

(54) SELECTIVE LASER PROCESSING OF TRANSPARENT WORKPIECE STACKS

(71) Applicant: Corning Incorporated, Corning, NY (US)

(72) Inventor: Uwe Stute, Neustadt am Rübenberge (DE)

(73) Assignee: Corning Incorporated, Corning, NY (US)

( * ) Notice: Subject to any disclaimer, the term of this patent is extended or adjusted under 35 U.S.C. 154(b) by 676 days.

(21) Appl. No.: 16/362,110

(22) Filed: Mar. 22, 2019

(65) Prior Publication Data

US 2019/0300417 A1    Oct. 3, 2019

Related U.S. Application Data

(60) Provisional application No. 62/649,753, filed on Mar. 29, 2018.

(51) Int. Cl.
*C03B 5/225* (2006.01)
*C03B 5/235* (2006.01)
(Continued)

(52) U.S. Cl.
CPC ...... *C03B 33/0222* (2013.01); *B23K 26/0624* (2015.10); *B23K 26/18* (2013.01);
(Continued)

(58) Field of Classification Search
CPC combination set(s) only.
See application file for complete search history.

(56) References Cited

U.S. PATENT DOCUMENTS

| 8,943,855 B2 * | 2/2015 | Gomez | C03B 33/091 |
| | | | 65/97 |
| 10,399,184 B2 * | 9/2019 | Hosseini | B23K 26/0619 |

(Continued)

FOREIGN PATENT DOCUMENTS

| CN | 104944656 A | 9/2015 |
| CN | 105392593 A | 3/2016 |

(Continued)

OTHER PUBLICATIONS

International Search Report and Written Opinion of the International Searching Authority; PCT/US2019/024670; dated Jul. 31, 2019; 12 Pages; European Patent Office.

(Continued)

*Primary Examiner* — Alison L Hindenlang
*Assistant Examiner* — Steven S Lee
(74) *Attorney, Agent, or Firm* — Amy T. Lang; John P. McGroarty

(57) ABSTRACT

A method for processing a transparent workpiece comprises forming an optically modified region in or on a transparent workpiece and forming a contour in the transparent workpiece, the contour comprising a plurality of defects in the transparent workpiece positioned laterally offset from the optically modified region. Forming the contour comprises directing a primary laser beam comprising a quasi-non diffracting beam oriented along a beam pathway onto the transparent workpiece such that a first caustic portion of the primary laser beam is directed into the transparent workpiece, thereby generating an induced absorption within the transparent workpiece to produce a defect within the transparent workpiece and a second caustic portion of the primary laser beam is modified by the optically modified region. Further, translating the transparent workpiece and the primary laser beam relative to each other along a contour line and laterally offset from the optically modified region.

20 Claims, 12 Drawing Sheets

(51) Int. Cl.
*C03B 33/02* (2006.01)
*B23K 26/364* (2014.01)
*B23K 26/40* (2014.01)
*C03B 33/10* (2006.01)
*B23K 26/0622* (2014.01)
*C03B 33/07* (2006.01)
*B23K 26/18* (2006.01)
*B23K 26/53* (2014.01)
*B23K 26/359* (2014.01)
*B23K 26/352* (2014.01)
*B23K 103/00* (2006.01)

(52) U.S. Cl.
CPC .......... *B23K 26/352* (2015.10); *B23K 26/359* (2015.10); *B23K 26/364* (2015.10); *B23K 26/40* (2013.01); *B23K 26/53* (2015.10); *C03B 33/07* (2013.01); *C03B 33/102* (2013.01); *B23K 2103/54* (2018.08)

(56) References Cited

U.S. PATENT DOCUMENTS

| | | | |
|---|---|---|---|
| 2015/0165563 A1* | 6/2015 | Manley | C03B 33/082 428/34 |
| 2015/0360991 A1 | 12/2015 | Grundmueller et al. | |
| 2016/0159679 A1* | 6/2016 | West | B23K 26/402 65/112 |
| 2017/0189991 A1* | 7/2017 | Gollier | B23K 26/0648 |
| 2018/0057390 A1* | 3/2018 | Hackert | B23K 26/364 |

FOREIGN PATENT DOCUMENTS

| | | | | |
|---|---|---|---|---|
| CN | 106029590 | A | | 10/2016 |
| CN | 106163724 | A | | 11/2016 |
| CN | 106457476 | A | | 2/2017 |
| CN | 107073642 | A | | 8/2017 |
| CN | 107073653 | A | | 8/2017 |
| CN | 107848860 | A | * | 3/2018 ............ B32B 17/00 |
| KR | 10-1358672 | B1 | | 2/2014 |
| KR | 20160124417 | A | * | 10/2016 |
| WO | 2012050376 | A2 | | 4/2012 |

OTHER PUBLICATIONS

Borghi et al; "M2 Factor of Bessel-Gauss Beams"; Optics Letters, vol. 22(5), 262 (1997.
Siegman; "New Developments in Laser Resonators"; SPIE Symposium Series vol. 1224, p. 2 (1990.
Chinese Patent Application No. 201980023875.4, Office Action, dated Apr. 19, 2022, 15 pages (8 pages of English Translation and 7 pages of Original Document), Chinese Patent Office.

* cited by examiner

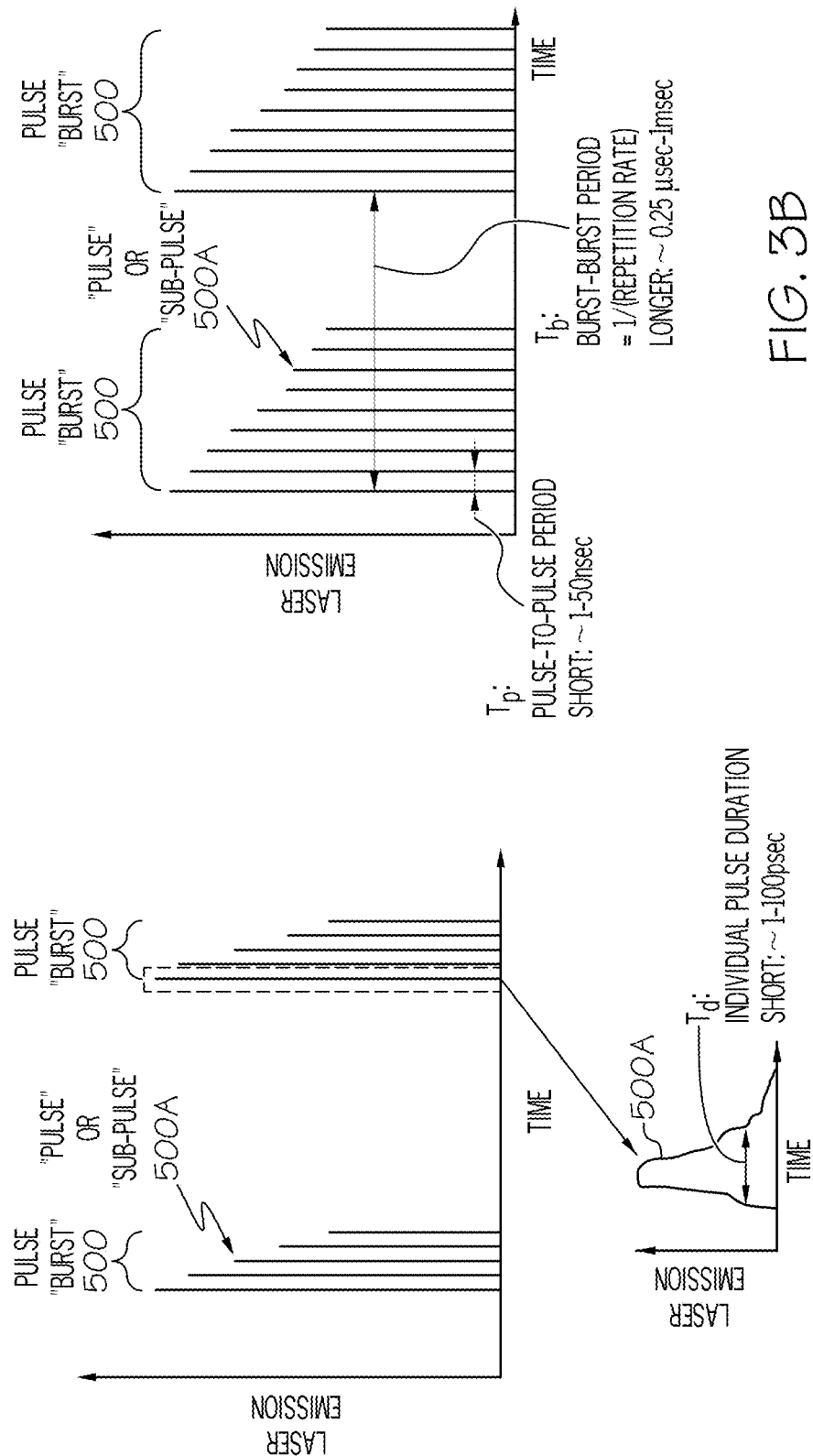

SELECTIVE LASER PROCESSING OF TRANSPARENT WORKPIECE STACKS

This application claims the benefit of priority to U.S. Provisional Application Ser. No. 62/649,753 filed on Mar. 29, 2018, the content of which is relied upon and incorporated herein by reference in its entirety.

BACKGROUND

Field

The present specification generally relates to apparatuses and methods for laser processing transparent workpieces, and more particularly, to selective laser processing workpiece stacks comprising multiple transparent workpieces.

Technical Background

The area of laser processing of materials encompasses a wide variety of applications that involve cutting, drilling, milling, welding, melting, etc. of different types of materials. Among these processes, one that is of particular interest is cutting or separating different types of transparent substrates in a process that may be utilized in the production of materials such as glass, sapphire, or fused silica for thin film transistors (TFT) or display materials for electronic devices.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

According to a first embodiment, a method for processing a transparent workpiece comprises forming an optically modified region in or on a transparent workpiece; and forming a contour in the transparent workpiece, the contour comprising a plurality of defects in the transparent workpiece positioned laterally offset from the optically modified region. Forming the contour comprises directing a primary laser beam comprising a quasi-non diffracting beam oriented along a beam pathway onto the transparent workpiece such that: a first caustic portion of the primary laser beam is directed into the transparent workpiece, thereby generating an induced absorption within the transparent workpiece, the induced absorption producing a defect within the transparent workpiece, at least of portion of the defect extending below at least a portion of the optically modified region; and a second caustic portion of the primary laser beam is modified by the optically modified region. The quasi-non diffracting beam comprises a wavelength $\lambda$; a spot size $w_o$; and a cross section that comprises a Rayleigh range $Z_R$ that is greater than $$F_D \frac{\pi w_0^2}{\lambda},$$

where $F_D$ is a dimensionless divergence factor comprising a value of 10 or greater. Further, translating the transparent workpiece and the primary laser beam relative to each other along a contour line and laterally offset from the optically modified region.

A second embodiment includes the method of the first embodiment, wherein the optically modified region comprises a modification track formed in the transparent workpiece.

A third embodiment includes the method of the second embodiment, wherein forming the modification track in the transparent workpiece comprises directing an auxiliary laser beam onto the transparent workpiece such that the auxiliary laser beam modifies at least a portion of the transparent workpiece; and translating the transparent workpiece and the auxiliary laser beam relative to each other along a modification line thereby modifying the transparent workpiece along the modification line, forming the modification track.

A fourth embodiment includes the method of the third embodiment, wherein the auxiliary laser beam and the primary laser beam each comprise a pulsed laser beam; the primary laser beam comprises a first pulse energy and the auxiliary laser beam comprises a second pulse energy; and the first pulse energy is greater than the second pulse energy.

A fifth embodiment includes the method of the fourth embodiment, wherein directing the auxiliary laser beam onto the transparent workpiece modifies a refractive index of at least a portion of the transparent workpiece; and translating the transparent workpiece and the auxiliary laser beam relative to each other along the modification line generates modified refractive index regions within the transparent workpiece, forming the modification track.

The sixth embodiment includes the method of the third embodiment, wherein directing the auxiliary laser beam onto the transparent workpiece ablates material from a first surface of the transparent workpiece.

The seventh embodiment includes the method of the sixth embodiment, wherein translating the transparent workpiece and the auxiliary laser beam relative to each other along a modification line ablates material from the first surface of the transparent workpiece along the modification line thereby forming the modification track.

The eighth embodiment includes the method of the sixth or seventh embodiments, wherein the auxiliary laser beam comprises a continuous wave laser beam.

The ninth embodiment includes the method of the sixth or seventh embodiments, wherein the auxiliary laser beam comprises an infrared laser beam.

The tenth embodiment includes the method of the sixth or seventh embodiment, wherein the auxiliary laser beam comprises a pulsed laser beam.

The eleventh embodiment includes the method of the second embodiment, wherein forming the modification track in the transparent workpiece comprises contacting a first surface of the transparent workpiece with a mechanical surface modification element; an translating the transparent workpiece and the mechanical surface modification element relative to each other along a modification line thereby modifying the first surface of the transparent workpiece along the modification line, forming the modification track.

The twelfth embodiment includes the method of the eleventh embodiment wherein the mechanical surface modification element comprises a grinding element.

The thirteenth embodiment includes the method of the eleventh embodiment wherein the mechanical surface modification element comprises a scoring wheel.

The fourteenth embodiment includes the method of the first embodiment, wherein the optically modified region comprises a disruptive material strip deposited on a first surface of the transparent workpiece.

The fifteenth embodiment includes the method of the fourteenth embodiment, wherein the disruptive material strip comprises an absorptive material.

The sixteenth embodiment includes the method of the fourteenth embodiment, wherein the disruptive material strip comprises a reflective material.

The seventeenth embodiment includes the method of the fourteenth embodiment, wherein the disruptive material strip comprises a scattering material.

The eighteenth embodiment includes the method of the fourteenth embodiment, wherein the disruptive material strip comprises a phase altering material.

The nineteenth embodiment includes any of the previous embodiments, wherein the optically modified region comprises a first optically modified region and the method further comprises forming a second optically modified region on or in the transparent workpiece; and the second optically modified region is positioned laterally offset from the first optically modified region such that the first optically modified region is disposed between the contour line and the second optically modified region.

The twentieth embodiment includes any of the previous embodiments, wherein the optically modified region comprises a first optically modified region and the method further comprises forming a second optically modified region in the transparent workpiece; and the second optically modified region is positioned laterally offset from the contour line such that the contour line is disposed between the first optically modified region and the second optically modified region.

The twenty-first embodiment includes any of the previous embodiments, wherein the optically modified region impinges a first surface of the transparent workpiece at an approach angle α; the optically modified region is laterally offset from the contour line by an offset distance $D_{OFF}$; and the optically modified region disrupts the formation of a laser beam focal line at a distance $D_{CUT}$ downstream the first surface of the transparent workpiece, wherein $D_{OFF}=D_{CUT} \tan \alpha$.

The twenty-second embodiment includes any of the previous embodiments, wherein the primary laser beam is directed through one or more lenses along the beam pathway such that the first caustic portion of the primary laser beam is directed into the transparent workpiece and forms a laser beam focal line within the transparent workpiece, wherein the laser beam focal line generates the induced absorption within the transparent workpiece, the induced absorption producing the defect within the transparent workpiece.

The twenty-third embodiment includes the method of the twenty-second embodiment, wherein at least one of the one or more lenses comprises an aspheric optical element.

The twenty-fourth embodiment includes the method of the twenty-third embodiment, wherein the aspheric optical element comprises a refractive axicon, a reflective axicon, negative axicon, a spatial light modulator, a diffractive optic, or a cubically shaped optical element.

The twenty-fifth embodiment includes any of the previous embodiments, wherein the dimensionless divergence factor $F_D$ comprises a value of from about 10 to about 2000.

The twenty-sixth embodiment includes any of the previous embodiments, wherein the dimensionless divergence factor $F_D$ comprises a value of from about 50 to about 1500.

The twenty-seventh embodiment includes any of the previous embodiments, wherein the dimensionless divergence factor $F_D$ comprises a value of from about 100 to about 1000.

The twenty-eighth embodiment includes any of the previous embodiments, wherein a spacing between adjacent defects is about 50 μm or less.

The twenty-ninth embodiment includes any of the previous embodiments, wherein a spacing between adjacent defects is about 25 μm or less.

The thirtieth embodiment includes any of the previous embodiments, wherein a spacing between adjacent defects is about 15 μm or less.

The thirty-first embodiment includes any of the previous embodiments, wherein the transparent workpiece comprises an alkali aluminosilicate glass material.

The thirty-second embodiment includes any of the previous embodiments, wherein the primary laser beam comprises a pulsed laser beam output by a beam source that produces pulse bursts comprising 2 sub-pulses per pulse burst or more.

The thirty-third embodiment includes any of the previous embodiments, wherein the transparent workpiece comprises a first transparent workpiece of a workpiece stack, the workpiece stack further comprising a second transparent workpiece; the optically modified region is formed in or on the first transparent workpiece and forming the contour in the first transparent workpiece, laterally offset from the optically modified region, comprises directing the primary laser beam comprising the quasi-non diffracting beam oriented along the beam pathway onto the first transparent workpiece such that the first caustic portion of the primary laser beam is directed into the first transparent workpiece; and the second caustic portion of the primary laser beam is modified by the optically modified region, thereby preventing the primary laser beam from generating an induced absorption within the second transparent workpiece.

According to a thirty-fourth embodiment, a method for processing a transparent workpiece comprises forming a modification track in a transparent workpiece and forming a contour in the transparent workpiece, the contour comprising a plurality of defects in the transparent workpiece positioned laterally offset from the modification track. Forming the contour comprises directing a primary laser beam comprising a quasi-non diffracting beam oriented along a beam pathway onto the transparent workpiece such that a first caustic portion of the primary laser beam is directed into the transparent workpiece, thereby generating an induced absorption within the transparent workpiece, the induced absorption producing a defect within the transparent workpiece, at least of portion of the defect extending below at least a portion of the modification track and a second caustic portion of the primary laser beam is modified by the modification track. The quasi-non diffracting beam comprises a wavelength λ; a spot size $w_o$; and a cross section that comprises a Rayleigh range $Z_R$ that is greater than $$F_D \frac{\pi w_0^2}{\lambda},$$

where $F_D$ is a dimensionless divergence factor comprising a value of 10 or greater and the primary laser beam comprises a pulsed laser beam output by a beam source that produces pulse bursts comprising 2 sub-pulses per pulse burst or more. Further, translating the transparent workpiece and the primary laser beam relative to each other along a contour line and laterally offset from the modification track.

According to a thirty-fifth embodiment, a method for processing a transparent workpiece comprises depositing a disruptive material strip on a first surface of a transparent workpiece and forming a contour in the transparent workpiece, the contour comprising a plurality of defects in the transparent workpiece positioned laterally offset from the disruptive material strip. Forming the contour comprises directing a primary laser beam comprising a quasi-non diffracting beam oriented along a beam pathway onto the transparent workpiece such that a first caustic portion of the primary laser beam is directed into the transparent workpiece, thereby generating an induced absorption within the transparent workpiece, the induced absorption producing a defect within the transparent workpiece; and a second caustic portion of the primary laser beam is modified by the disruptive material strip. The quasi-non diffracting beam comprises a wavelength $\lambda$; a spot size $w_o$; and a cross section that comprises a Rayleigh range $Z_R$ that is greater than $$F_D \frac{\pi w_0^2}{\lambda},$$

where $F_D$ is a dimensionless divergence factor comprising a value of 10 or greater and the primary laser beam comprises a pulsed laser beam output by a beam source that produces pulse bursts comprising 2 sub-pulses per pulse burst or more. Further, translating the transparent workpiece and the primary laser beam relative to each other along a contour line and laterally offset from the disruptive material strip.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3A graphically depicts the relative intensity of laser pulses within an exemplary pulse burst vs. time, according to one or more embodiments described herein;

FIG. 3B graphically depicts relative intensity of laser pulses vs. time within another exemplary pulse burst, according to one or more embodiments described herein;

DETAILED DESCRIPTION

Figure 1A:
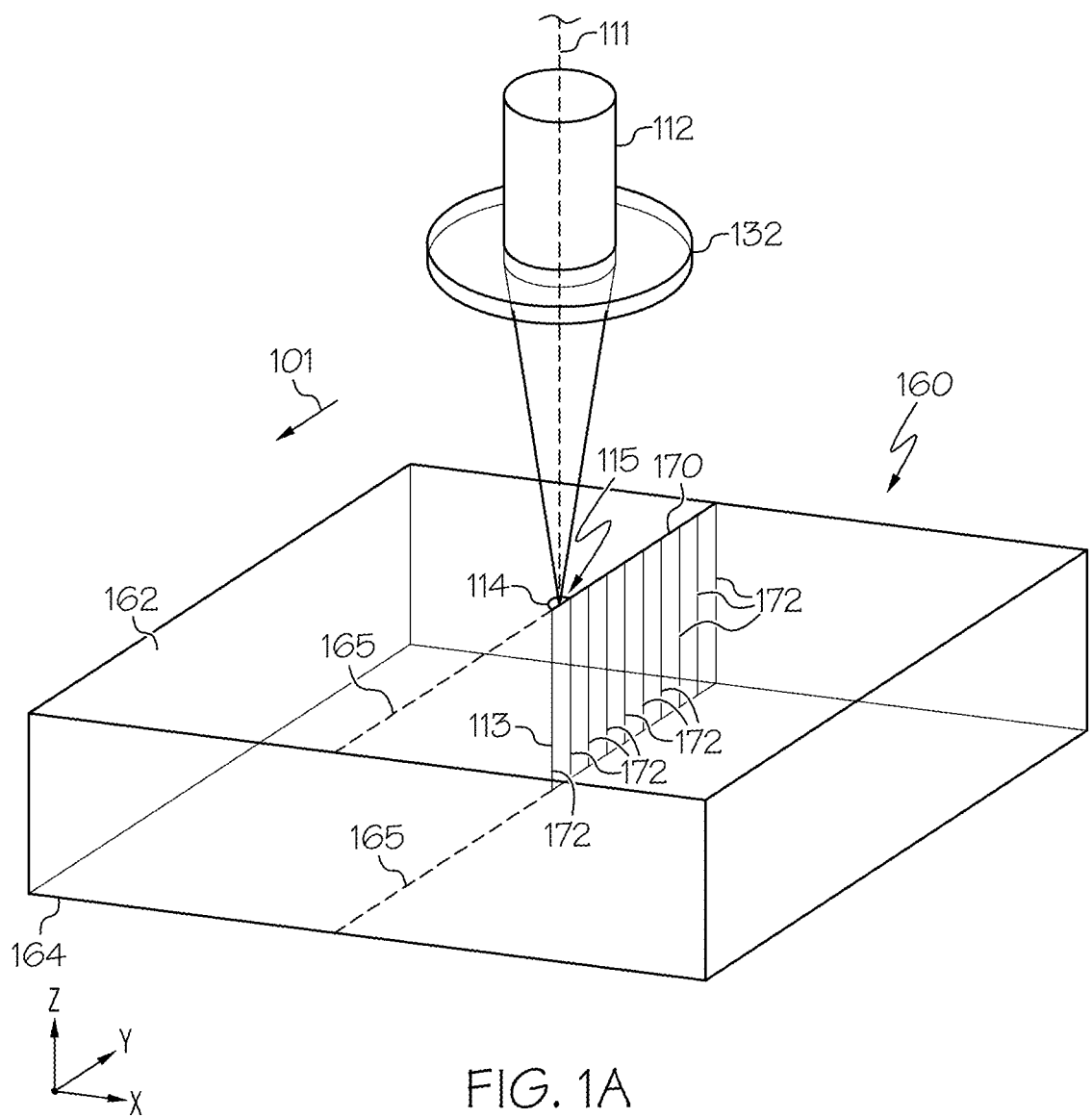
FIG. 1A schematically depicts the formation of a contour of defects in a transparent workpiece according to one or more embodiments described herein.

Reference will now be made in detail to embodiments of processes for forming and laser processing transparent workpieces and workpiece stacks comprising a plurality of transparent workpieces, examples of which are illustrated in the accompanying drawings. Whenever possible, the same reference numerals will be used throughout the drawings to refer to the same or like parts. Laser processing the workpiece stack may comprise directing (e.g., focusing) a laser beam (e.g., a pulsed laser beam) into at least one transparent workpiece of the workpiece stack to alter the transparent workpiece, for example, separate the transparent workpiece, form a grating in the transparent workpiece, or the like. In some embodiments, it may be advantageous to direct the laser beam to form a laser beam focal line in at least one portion of the workpiece stack and not in at least one other portion of the workpiece stack, where these different portions are located in different depth positions of the workpiece stack As one example, it may be advantageous to direct the laser beam into a laser beam focal line in a first transparent workpiece and not into a laser beam focal line in a second transparent workpiece. As another example, it may be advantageous to direct the laser beam to form a laser beam focal line in one portion of the first transparent workpiece and not in another portion of the first transparent workpiece, where these different portions are located in different depth positions of the first transparent workpiece. Furthermore, current methods to control the depth and positioning of a laser in a cutting processes requires sensors and fast-shift focusing optics.

Embodiments are described herein to facilitate this selective laser processing without the use of sensors and fast-shift focusing optics. As one example, the methods of selective laser processing comprise forming an optically modified region on or in a transparent workpiece of the transparent workpiece stack, offset by an offset distance from a contour line (e.g., a desired line of separation) of the transparent workpiece. The optically modified region may comprise a modification track or a disruptive material strip. The modification track may comprise one or more regions of the transparent workpiece that have an optical property modification sufficient to modify wavefronts of a first caustic portion of the laser beam such that the first caustic portion does not form a laser beam focal line in a selected portion of the transparent workpiece stack, such as the second transparent workpiece. The disruptive material strip comprises a material disposed on a surface of the transparent workpiece having optical properties sufficient to modify the wavefronts of the first caustic portion of the laser beam such that the wavefronts of the first caustic portion do not form the laser beam focal line in a selected portion of the workpiece stack, such as the second transparent workpiece. Further, the lateral distance between the top of the optically modified region and the geometry of the caustic of the laser beam control where the laser beam focal line will end. The vertical position of the transparent workpiece relative to the laser beam does not need to be precisely controlled at any time—not when the optically modified region is being formed/deposited, and not when a contour of defects is being laser formed along the contour line. Thus, the use of sensors and fast-shifting optics to precisely control vertical position can be avoided. Various embodiments of selective laser processing of a transparent workpiece and/or a workpiece stack will be described herein with specific references to the appended drawings.

As used herein, "laser processing" comprises directing a laser beam onto and/or into a transparent workpiece. In some embodiments, laser processing further comprises translating the laser beam relative to the transparent workpiece, for example, along a contour line, along a modification line, or along another pathway. Examples of laser processing include using a laser beam to form a contour comprising a series of defects that extend into the transparent workpiece, using a laser beam to form a modification track in the transparent workpiece, and using an infrared laser beam to heat the transparent workpieces of the laminate workpiece stack. Laser processing may separate the transparent workpiece along one or more desired lines of separation. However, in some embodiments, additional, non-laser steps may be utilized to separate the transparent workpieces along one or more desired lines of separation.

As used herein, "contour line," denotes a linear, angled, polygonal or curved line on a surface of a transparent workpiece that defines the path traversed by the laser beam as it is moved within the plane of the workpiece to create a corresponding contour.

As used herein, "contour," refers to a set of defects in a workpiece formed by translating a laser along a contour line. As used herein, a contour refers to a virtual two dimensional shape or path in or on a substrate. Thus, while a contour itself is a virtual shape, the contour may be manifest, for example, by a fault line or a crack. A contour defines a surface of desired separation in the workpiece. A contour may be formed by creating a plurality of defects in the transparent workpiece using various techniques along the contour line, for example by directed a pulsed laser beam at successive points along the contour line. Multiple contours and/or lasers with curved focal lines may be used to create complex shapes, such as a beveled surface of separation.

As used herein, a "fault line" refers to a series of closely spaced defect lines extending along and approximating a contour.

As used herein, a "defect" refers to a region of modified material (e.g., a region of modified refractive index relative to the bulk material), void space, crack, scratch, flaw, hole, perforation or other deformities in the transparent workpiece. These defects may be referred to, in various embodiments herein, as defect lines or damage tracks. A defect line or damage track is formed by a laser beam directed onto a single position of the transparent workpiece, for a single laser pulse or multiple pulses at the same location. Translating the laser along the contour line results in multiple defect lines that form a contour. For a line focus laser, the defect may have a linear shape.

As used herein, the phrase "beam cross section" refers to the cross section of a laser beam along a plane perpendicular to a beam propagation direction of the laser beam, for example, along an X-Y plane when the beam propagation direction is in a Z direction.

As used herein, "beam spot" refers to a cross section of a laser beam (e.g., a beam cross section) in the impingement surface, i.e., the surface of a transparent workpiece in closest proximity to the laser optics.

As used herein, "impingement surface" refers to the surface of a transparent workpiece in closest proximity to the laser optics.

As used herein, "upstream" and "downstream" refer to the relative position of two locations or components along a beam pathway with respect to a beam source. For example, a first component is upstream from a second component if the first component is closer to the laser optics along the path traversed by the laser beam than the second component.

As used herein, "laser beam focal line," refers to pattern of interacting (e.g., crossing) light rays of a laser beam that form a linear, elongated focused region, parallel to an optical axis. The laser beam focal line comprises aberrated light rays that interact (e.g., cross) an optical axis of the laser beam at different positions along the optical axis. Furthermore, the laser beam focal lines described herein are formed using a quasi-non-diffracting beam, mathematically defined in detail below.

As used herein, a "caustic" refers to an envelope of light of a laser beam refracted by an optical component and thereafter directed onto and/or a transparent workpiece. For example, the caustic may comprise the envelope of light of a laser beam extending from the most downstream optical component of an optical system onto and/or into a transparent workpiece. Moreover, wavefronts of the caustic may interact (e.g., cross) to form a laser beam focal line, for example, within a transparent workpiece.

As used herein, the "optically modified region," is a region formed in the transparent workpiece or a material disposed on the transparent workpiece comprising optical properties sufficient to modify the portion of the caustic that impinges, and in some embodiments, traverses, the optically modifies region. Example optical properties of the optically modified region include, blocking properties, scattering properties, reflecting properties, absorption properties, refractive properties, diffracting properties, phase altering properties, or the like. Example optically modified regions described herein include a modification track and a disruptive material strip.

As used herein, a portion of a caustic is "modified" by an optically modified region when the optically modified region alters the wavefronts of a caustic in a manner that reduces the intensity of or prevent the formation of a laser beam focal line along the path of the wavefront in the portion of a caustic to the point where a defect is not formed in a place where it would have formed in the absence of the optically modified region. Example modifications of wavefronts of the caustic may comprise blocking, absorbing, refracting, diffracting, reflecting, scattering, or phase altering the wavefronts.

The phrase "transparent workpiece," as used herein, means a workpiece formed from glass, glass-ceramic or other material which is transparent, where the term "transparent," as used herein, means that the material has an optical absorption of less than 20% per mm of material depth, such as less than 10% per mm of material depth for the specified pulsed laser wavelength, or such as less than 1% per mm of material depth for the specified pulsed laser wavelength. Unless otherwise specified, the material has an optical absorption of less than about 20% per mm of material depth, The transparent workpiece may have a depth (e.g., thickness) of from about 50 microns (μm) to about 10 mm (such as from about 100 μm to about 5 mm, or from about 0.5 mm to about 3 mm. Transparent workpieces may comprise glass workpieces formed from glass compositions, such as borosilicate glass, soda-lime glass, aluminosilicate glass, alkali aluminosilicate, alkaline earth aluminosilicate glass, alkaline earth boro-aluminosilicate glass, fused silica, or crystalline materials such as sapphire, silicon, gallium arsenide, or combinations thereof. In some embodiments the transparent workpiece may be strengthened via thermal tempering before or after laser processing the transparent workpiece. In some embodiments, the glass may be ion-exchangeable, such that the glass composition can undergo ion-exchange for glass strengthening before or after laser processing the transparent workpiece. For example, the transparent workpiece may comprise ion exchanged and ion exchangeable glass, such as Corning Gorilla® Glass available from Corning Incorporated of Corning, N.Y. (e.g., code 2318, code 2319, and code 2320). Further, these ion exchanged glasses may have coefficients of thermal expansion (CTE) of from about 6 ppm/° C. to about 10 ppm/° C. Other example transparent workpieces may comprise EAGLE XG® and CORNING LOTUS' available from Corning Incorporated of Corning, N.Y. Moreover, the transparent workpiece may comprise other components which are transparent to the wavelength of the laser, for example, crystals such as sapphire or zinc selenide.

In an ion exchange process, ions in a surface layer of the transparent workpiece are replaced by larger ions having the same valence or oxidation state, for example, by partially or fully submerging the transparent workpiece in an ion exchange bath. Replacing smaller ions with larger ions causes a layer of compressive stress to extend from one or more surfaces of the transparent workpiece to a certain depth within the transparent workpiece, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer. In some embodiments, smaller sodium ions in the surface layer of the transparent workpiece are exchanged with larger potassium ions. In some embodiments, the ions in the surface layer and the larger ions are monovalent alkali metal cations, such as Li+(when present in the glass), Na+, K+, Rb+, and Cs+. Alternatively, monovalent cations in the surface layer may be replaced with monovalent cations other than alkali metal cations, such as Ag+, Tl+, Cu+, or the like.

Figure 1B:
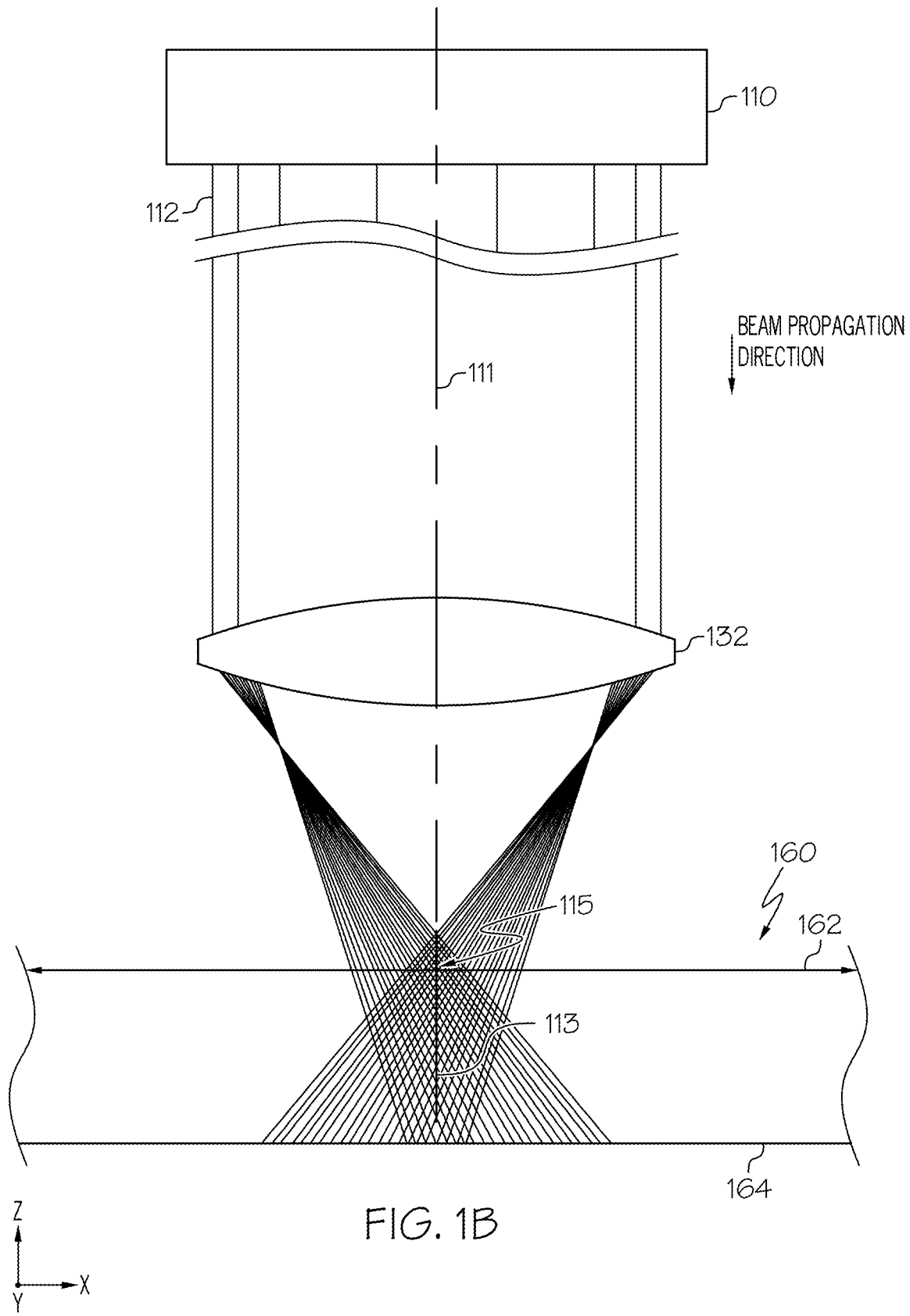
FIG. 1B schematically depicts the positioning of a laser beam focal line during processing of a transparent workpiece, according to one or more embodiments described herein.

Referring now to FIGS. 1A and 1B, an example transparent workpiece 160 is schematically depicted undergoing laser processing according to the methods described herein. In particular, FIG. 1A schematically depicts the formation of a contour 170 comprising a plurality of defects 172, which may be used to separate the transparent workpieces 160. The contour 170 comprising the plurality of defects 172 may be formed by processing the transparent workpiece 160 with a laser beam 112, which may comprise an ultra-short pulsed laser beam moving in a translation direction 101 along a contour line 165. The defects 172 may extend, for example, through the depth of the transparent workpiece 160, and may be orthogonal to an impingement surface of the transparent workpiece 160. Further, the laser beam 112 initially contacts the transparent workpiece 160 at an impingement location 115, which is a specific location on the impingement surface. As depicted in FIGS. 1A and 1B, a first surface 162 of the transparent workpiece 160 comprises the impingement surface, however, it should be understood that in other embodiments, the laser beam 112 may instead initially irradiate a second surface 164 of the transparent workpiece 160. Furthermore, FIG. 1A depicts that the laser beam 112 forms a beam spot 114 projected onto the first surface 162 of the transparent workpiece 160.

FIGS. 1A and 1B depict the laser beam 112 propagating along a beam pathway 111 and oriented such that the laser beam 112 may be focused into a laser beam focal line 113 within the transparent workpiece 160, for example, using an aspheric optical element 120 (FIG. 2), for example, an axicon and one or more lenses (e.g., a first lens 130 and a second lens 132, as described below and depicted in FIG. 2). For example, the position of the laser beam focal line 113 may be controlled along the Z-axis and about the Z-axis. Further, the laser beam focal line 113 may have a length in a range of from about 0.1 mm to about 100 mm or in a range of from about 0.1 mm to about 10 mm. Various embodiments may be configured to have a laser beam focal line 113 with a length 1 of about 0.1 mm, about 0.2 mm, about 0.3 mm, about 0.4 mm, about 0.5 mm, about 0.7 mm, about 1 mm, about 2 mm, about 3 mm, about 4 mm, or about 5 mm e.g., from about 0.5 mm to about 5 mm. Further, the laser beam focal line 113 may be a portion of a quasi-non-diffracting beam, as defined in more detail below.

In operation, the laser beam 112 may be translated relative to the transparent workpiece 160 (e.g., in the translation direction 101) along the contour line 165 to form the plurality of defects 172 of the contour 170. Directing or localizing the laser beam 112 into the transparent workpiece 160 generates an induced absorption within the transparent workpiece 160 and deposits enough energy to break chemical bonds in the transparent workpiece 160 at spaced locations along the contour line 165 to form the defects 172. According to one or more embodiments, the laser beam 112 may be translated across the transparent workpiece 160 by motion of the transparent workpiece 160 (e.g., motion of a translation stage 190 coupled to the transparent workpiece 160, as shown in FIG. 2), motion of the laser beam 112 (e.g., motion of the laser beam focal line 113), or motion of both the transparent workpiece 160 and the laser beam focal line 113. By translating the laser beam focal line 113 relative to the transparent workpiece 160, the plurality of defects 172 may be formed in the transparent workpiece 160.

In some embodiments, the defects 172 may generally be spaced apart from one another by a distance along the contour 170 of from about 0.1 µm to about 500 µm, for example, about 1 µm to about 200 µm, about 2 µm to about 100 µm, about 5 µm to about 20 µm, or the like. For example, suitable spacing between the defects 172 may be from about 0.1 µm to about 50 µm, such as from about 5 µm to about 15 µm, from about 5 µm to about 12 µm, from about 7 µm to about 15 µm, or from about 7 µm to about 12 µm for the TFT/display glass compositions. In some embodiments, a spacing between adjacent defects 172 may be about 50 µm or less, 45 µm or less, 40 µm or less, 35 µm or less, 30 µm or less, 25 µm or less, 20 µm or less, 15 µm or less, 10 µm or less, or the like.

As illustrated in FIG. 1A, the plurality of defects 172 of the contour 170 extend into the transparent workpiece 160 and establish a path for crack propagation for separation of the transparent workpiece 160 into separate portions along the contour 170. Forming the contour 170 comprises translating the laser beam 112 relative to the transparent workpiece 160 (e.g., in the translation direction 101) along the contour line 165 to form the plurality of defects 172 of the contour 170. According to one or more embodiments, the laser beam 112 may be translated across the transparent workpiece 160 by motion of the transparent workpiece 160, motion of the laser beam 112 (e.g., motion of the laser beam focal line 113), or motion of both the transparent workpiece 160 and the laser beam 112, for example, using one or more translation stages 190 (FIG. 2). By translating the laser beam focal line 113 relative to the transparent workpiece 160, the plurality of defects 172 may be formed in the transparent workpiece 160. Moreover, while the contour 170 illustrated in FIG. 1A is linear, the contour 170 may also be nonlinear (i.e., having a curvature). Curved contours may be produced, for example, by translating either the transparent workpiece 160 or laser beam focal line 113 with respect to the other in two dimensions instead of one dimension.

In some embodiments, the transparent workpiece 160 may be further acted upon in a subsequent separating step to induce separation of the transparent workpiece 160 along the contour 170. The subsequent separating step may include using mechanical force or thermal stress induced force to propagate a crack along the contour 170. The thermal source, such as an infrared laser beam, may be used to create thermal stress and thereby separate the transparent workpiece 160 along the contour 170. In some embodiments, the infrared laser beam may be used to initiate separation and then the separation may be finished mechanically. Without being bound by theory, the infrared laser is a controlled heat source that rapidly increases the temperature of the transparent workpiece 160 at or near the contour 170. This rapid heating may build compressive stress in the transparent workpiece 160 on or adjacent to the contour 170. Since the area of the heated glass surface is relatively small compared to the overall surface area of the transparent workpiece 160, the heated area cools relatively rapidly. The resultant temperature gradient induces tensile stress in the transparent workpiece 160 sufficient to propagate a crack along the contour 170 and through the depth of the transparent workpiece 160, resulting in full separation of the transparent workpiece 160 along the contour 170. Without being bound by theory, it is believed that the tensile stress may be caused by expansion of the glass (i.e., changed density) in portions of the workpiece with higher local temperature.

Suitable infrared lasers to create thermal stress in glass would typically have wavelengths that are readily absorbed by glass, typically having wavelengths ranging from 1.2 µm to 13 µm, for example, a range of 4 µm to 12 µm. Further, the power of the infrared laser beam may be from about 10 W to about 1000 W, for example 100 W, 250 W, 500 W, 750 W, or the like. Moreover, the $1/e^2$ beam diameter of the infrared laser beam may be about 20 mm or less, for example, 15 mm, 12 mm, 10 mm, 8 mm, 5 mm, 2 mm, or less. In operation, a larger $1/e^2$ beam diameter of the infrared laser beam may facilitate faster laser processing and more power while a smaller $1/e^2$ beam diameter of the infrared laser beam may facilitate high precision separation by limiting damage to portions of the transparent workpiece 160 near the contour 170. Example infrared lasers include a carbon dioxide laser (a "$CO_2$ laser"), a carbon monoxide laser (a "CO laser"), a solid state laser, a laser diode, or combinations thereof.

In other embodiments, stress present in the transparent workpiece 160, depending on the type, depth, and material properties (e.g., absorption, CTE, stress, composition, etc.) may cause spontaneous separation along the contour 170 without further heating or mechanical separation steps. For example, when the transparent workpiece 160 comprises a strengthened glass substrate (e.g., an ion-exchanged or thermally tempered glass substrate), the formation of the contour 170 may induce crack propagation along the contour 170 to separate the transparent workpiece 160.

Referring again to FIGS. 1A and 1B, the laser beam 112 used to form the defects 172 further has an intensity distribution I(X,Y,Z), where Z is the beam propagation direction of the laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the laser beam 112 in a cross-sectional plane may be referred to as a cross-sectional intensity distribution.

The laser beam 112 at the beam spot 114 or other cross sections may comprise a quasi-non-diffracting beam, for example, a beam having low beam divergence as mathematically defined below, by propagating the laser beam 112 (e.g., the laser beam 112, such as a Gaussian beam, using a beam source 110, such as a pulsed beam source) through an aspheric optical element 120, as described in more detail below with respect to the optical assembly 100 depicted in FIG. 2. Beam divergence refers to the rate of enlargement of the beam cross section in the direction of beam propagation (i.e., the Z direction). One example beam cross section discussed herein is the beam spot 114 of the laser beam 112 projected onto the transparent workpiece 160. Example quasi non-diffracting beams include Gauss-Bessel beams and Bessel beams.

Diffraction is one factor that leads to divergence of laser beams 112. Other factors include focusing or defocusing caused by the optical systems forming the laser beams 112 or refraction and scattering at interfaces. Laser beams 112 for forming the defects 172 of the contours 170 may form laser beam focal lines 113 with low divergence and weak diffraction. The divergence of the laser beam 112 is characterized by the Rayleigh range $Z_R$, which is related to the variance $\sigma^2$ of the intensity distribution and beam propagation factor $M^2$ of the laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser-related equipment—Test methods for laser beam widths, divergence angles and beam propagation ratios—Part 1:Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment—Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the laser beam 112 having a time-averaged intensity profile I(x, y, z) are given by the following expressions:

$$\bar{x}(z) = \frac{\int_{-\infty}^{\infty}\int_{-\infty}^{\infty} xI(x, y, z)dxdy}{\int_{-\infty}^{\infty}\int_{-\infty}^{\infty} I(x, y, z)dxdy} \quad (1)$$

$$\bar{y}(z) = \frac{\int_{-\infty}^{\infty}\int_{-\infty}^{\infty} yI(x, y, z)dxdy}{\int_{-\infty}^{\infty}\int_{-\infty}^{\infty} I(x, y, z)dxdy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I (x, y, z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z)dxdy}{\int_{-\infty}^{\infty}\int_{-\infty}^{\infty} I(x, y, z)dxdy} \quad (3)$$

$$\sigma_{0y}^2(z) = \frac{\int_{-\infty}^{\infty}\int_{-\infty}^{\infty} y^2 I(x, y, z)dxdy}{\int_{-\infty}^{\infty}\int_{-\infty}^{\infty} I(x, y, z)dxdy} \quad (4)$$

$$\sigma_{\infty x}^2 = \frac{\int_{-\infty}^{\infty}\int_{-\infty}^{\infty} v_x^2 \tilde{I}(v_x, v_y)dv_x dv_y}{\int_{-\infty}^{\infty}\int_{-\infty}^{\infty} \tilde{I}(v_x, v_y)dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y)dv_x dv_y}{\int_{-\infty}^{\infty}\int_{-\infty}^{\infty} \tilde{I}(v_x, v_y)dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile ũ(x, y, z) for an arbitrary optical beam (where I(x, y, z)≡|ũ(x, y, z)|²) and the spatial-frequency distribution $\tilde{P}(v_x, v_y, z)$ for an arbitrary optical beam (where $\tilde{I}(v_x, v_y)\equiv|\tilde{P}(v_x, v_y, z)|^2$), it can be shown that:

$$\sigma_x^2(z) = \sigma_{0x}^2(z_{0x}) + \lambda^2 \pi \sigma_{\infty x}^2 (z - z_{0x})^2 \quad (7)$$

$$\sigma_y^2(z) = \sigma_{0y}^2(z_{0y}) + \lambda^2 \sigma_{\infty y}^2 (z - z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$, in the x-direction and y-direction, respectively, and X is the wavelength of the laser beam 112. Equations (7) and (8) indicate that $\sigma_x^2(z)$ and $\sigma_y^2(z)$ increase quadratically with z in either direction from the minimum values associated with the waist position of the laser beam 112 (e.g., the waist portion of the laser beam focal line 113). Further, in the embodiments described herein comprising a beam spot 114 that is axisymmetric and thereby comprises an axisymmetric intensity distribution I(x,y), $\sigma_x^2(z)=\sigma_y^2(z)$ and in the embodiments described herein comprising a beam spot 114 that is non-axisymmetric and thereby comprises a non-axisymmetric intensity distribution I(x,y), $\sigma_x^2(z)\neq\sigma_y^2(z)$, i.e., $\sigma_x^2(z)<\sigma_y^2(z)$ or $\sigma_x^2(z)>\sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi\sigma_{0x}\sigma_{\infty x} \quad (9)$$

$$M_y^2 = 4\pi\sigma_{0y}\sigma_{\infty y} \quad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z - z_{0x})^2 \quad (11)$$

$$\sigma_y^2(z) = \sigma_{0y}^2(z_{0y}) + \frac{\lambda^2 M_y^4}{(4\pi\sigma_{0y})^2}(z - z_{0y})^2 \quad (12)$$

which can be rewritten as:

$$\sigma_x^2(z) = \sigma_{0x}^2(z_{0x})\left[1 + \frac{(z-z_{0x})^2}{Z_{Rx}^2}\right] \quad (13)$$

$$\sigma_y^2(z) = \sigma_{0y}^2(z_{0y})\left[1 + \frac{(z-z_{0y})^2}{Z_{Ry}^2}\right] \quad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2\lambda} \quad (15)$$

$$Z_{Ry} = \frac{4\pi\sigma_{0y}^2}{M_y^2\lambda} \quad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution I(x,y), $Z_{Rx}=Z_{Ry}$ and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx}<Z_{Ry}$ or $Z_{Rx}>Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x, y, z) that describes the laser beam. In the case of the TEM$_{00}$ mode of a Gaussian beam, the intensity profile is given by:

$$I(x, y) = \frac{\sqrt{\pi}}{2} w_o e^{\frac{-2(x^2+y^2)}{w_o^2}} \quad (17)$$

where $w_o$ is the radius (defined as the radius at which beam intensity decreases to 1/e$^2$ of the peak beam intensity of the beam at a beam waist position $z_o$. From Equation (17) and the above formulas, we obtain the following results for a TEM$_{00}$ Gaussian beam:

$$\sigma_{0x}^2 = \sigma_{0y}^2 = \frac{w_o^2}{4} \quad (18)$$

$$\sigma_{\infty x}^2 = \sigma_{\infty y}^2 = \frac{1}{4\pi^2 w_o^2} \quad (19)$$

$$M_x^2 = 4\pi\sigma_{0x}\sigma_{\infty x} = 1 \quad (20)$$

$$M_y^2 = 4\pi\sigma_{0y}\sigma_{\infty y} = 1 \quad (21)$$

$$Z_{Rx} = \frac{4\pi\sigma_{0x}^2}{M_x^2\lambda} = \frac{\pi w_o^2}{\lambda} \quad (22)$$

$$Z_{Ry} = \frac{4\pi\sigma_{0y}^2}{M_y^2\lambda} = \frac{\pi w_0^2}{\lambda} \quad (23)$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \quad (24)$$

where $Z_R=Z_{Rx}=Z_{Ry}$. For Gaussian beams, it is further noted that $M^2=M_x^2=M_y^2=1$.

Beam cross section is characterized by shape and dimensions. The dimensions of the beam cross section are characterized by a spot size of the beam. For a Gaussian beam, spot size is frequently defined as the radial extent at which the intensity of the beam decreases to 1/e$^2$ of its maximum value, denoted in Equation (17) as $w_o$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_0$, which from Equation (18) corresponds to $2\sigma_{0x}$ or $2\sigma_{0y}$. For an axisymmetric beam having an axisymmetric cross section, such as a circular cross section, $\sigma_{0x}=\sigma_{0y}$. Thus, for axisymmetric beams, the cross section dimension may be characterized with a single spot size parameter, where $w_o=2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox}=2\sigma_{0x} \quad (25)$$

$$w_{oy}=2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle φ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min}=2\sigma_{0,min} \quad (27)$$

$$w_{o,max}=2\sigma_{0,max} \quad (28)$$

where $2\sigma_{0,min}=2\sigma_{0x}(\phi_{min,x})=2\sigma_{0y}(\phi_{min,y})$ and $2\sigma_{0,max}=2\sigma_{0x}(\phi_{max,x})=2\sigma_{0y}(\phi_{max,y})$. The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, or the like To promote uniformity of defects 172 in the beam propagation direction (e.g. depth dimension of the transparent workpiece 160), a laser beam 112 having low divergence may be used. In one or more embodiments, laser beams 112 having low divergence may be utilized for forming defects 172. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 > 1$ and $M_y^2 > 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects 172 because, when focused to small enough spot sizes (such as spot sizes in the range of microns, such as about 1-5 μm or about 1-10 μm) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \quad (29)$$

and $$Z_{Ry,min} = \frac{4\pi\sigma_{0,min}^2}{M_y^2 \lambda} \quad (30)$$

Since divergence of the laser beam occurs over a shorter distance in the direction having the smallest Rayleigh range, the intensity distribution of the laser beam 112 used to form defects 172 may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 μm, greater than or equal to 100 μm, greater than or equal to 200 μm, greater than or equal to 300 μm, greater than or equal to 500 μm, greater than or equal to 1 mm, greater than or equal to 2 mm, greater than or equal to 3 mm, greater than or equal to 5 mm, in the range from 50 μm to 10 mm, in the range from 100 μm to 5 mm, in the range from 200 μm to 4 mm, in the range from 300 μm to 2 mm, or the like.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 μm, greater than or equal to 0.50 μm, greater than or equal to 0.75 μm, greater than or equal to 1.0 μm, greater than or equal to 2.0 μm, greater than or equal to 3.0 μm, greater than or equal to 5.0 μm, in the range from 0.25 μm to 10 μm, in the range from 0.25 μm to 5.0 μm, in the range from 0.25 μm to 2.5 μm, in the range from 0.50 μm to 10 μm, in the range from 0.50 μm to 5.0 μm, in the range from 0.50 μm to 2.5 μm, in the range from 0.75 μm to 10 μm, in the range from 0.75 μm to 5.0 μm, in the range from 0.75 μm to 2.5 μm, or the like.

Non-diffracting or quasi non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of at least 10, at least 50, at least 100, at least 250, at least 500, at least 1000, in the range from 10 to 2000, in the range from 50 to 1500, in the range from 100 to 1000. By comparing Equation (31) to Equation (22) or (23), one can see that for a non-diffracting or quasi non-diffracting beam the distance, Smaller of $Z_{Rx,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the laser beam 112 is considered quasi-non-diffracting if the characteristics of the laser beam satisfy Equation (31) or Equation (32) with a value of $F_D \geq 10$. As the value of $F_D$ increases, the laser beam 112 approaches a more nearly perfect non-diffracting state.

Moreover, it should be understood that Equation (32) is merely a simplification of Equation (31) and as such, Equation (31) mathematically describes the dimensionless divergence factor $F_D$ for both axisymmetric and non-axisymmetric pulsed laser beams 112.

Figure 2:
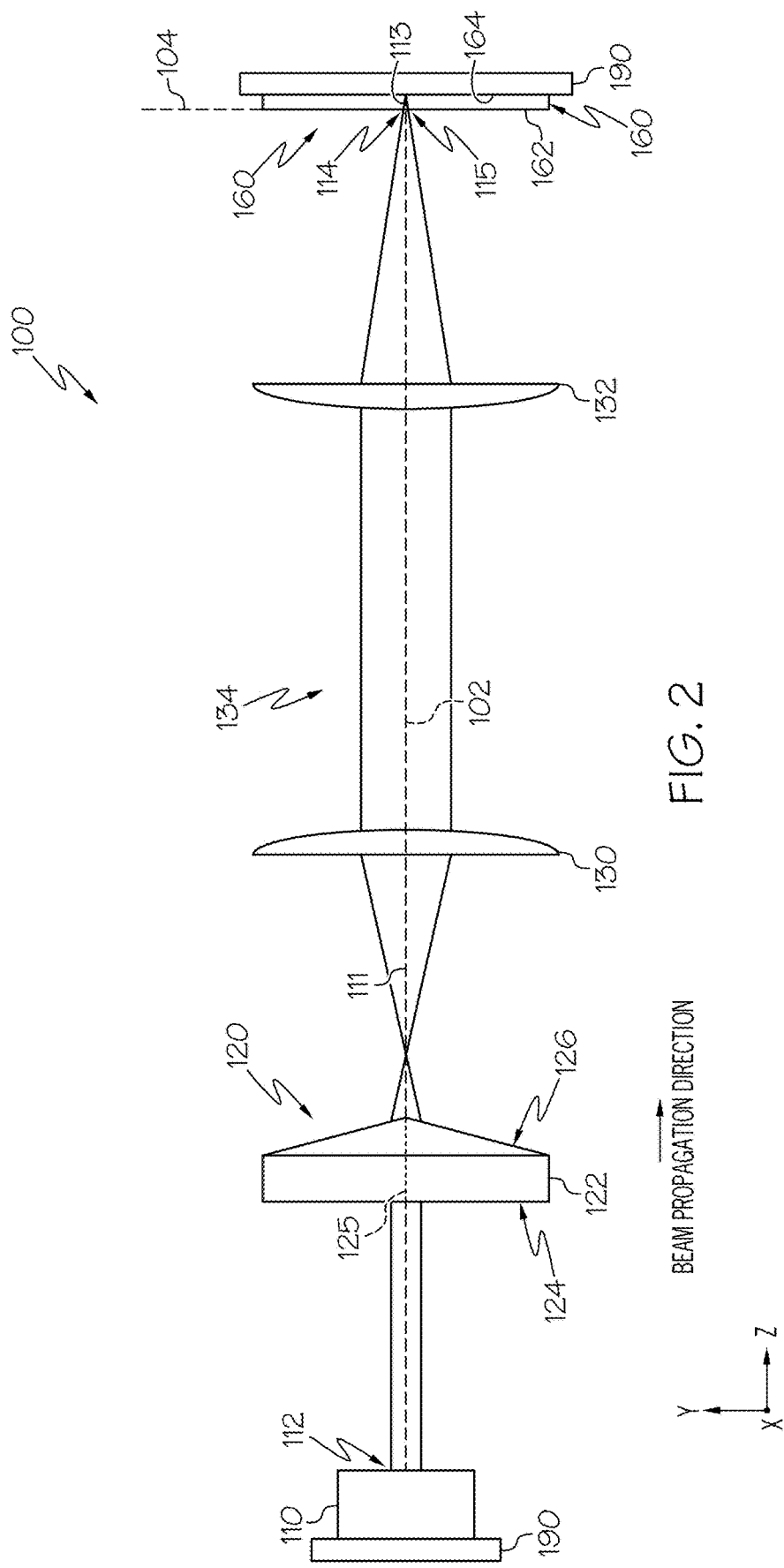
FIG. 2 schematically depicts an optical assembly for laser processing, according to one or more embodiments described herein.

Referring now to FIG. 2, an optical assembly 100 for producing a laser beam 112 that that is quasi-non-diffracting and forms the laser beam focal line 113 at the transparent workpiece 160 using the aspheric optical element 120 (e.g., an axicon 122) is schematically depicted. The optical assembly 100 includes a beam source 110 that outputs the laser beam 112, first lens 130 and second lens 132. The beam source 110 may comprise any known or yet to be developed beam source 110 configured to output laser beams 112, for example, pulsed laser beams or continuous wave laser beams. In some embodiments, the beam source 110 may output a laser beam 112 comprising a wavelength of for example, 1064 nm, 1030 nm, 532 nm, 530 nm, 355 nm, 343 nm, or 266 nm, or 215 nm. Further, the laser beam 112 used to form defects 172 in the transparent workpiece 160 may be well suited for materials that are transparent to the selected pulsed laser wavelength.

Further, the transparent workpiece 160 may be positioned such that the laser beam 112 output by the beam source 110 irradiates the transparent workpiece 160, for example, after traversing the aspheric optical element 120 and thereafter, both the first lens 130 and the second lens 132. An optical axis 102 extends between the beam source 110 and the transparent workpiece 160 (along the Z-axis in the embodiment depicted in FIG. 2) such that when the beam source 110 outputs the laser beam 112, the beam pathway 111 of the laser beam 112 extends along the optical axis 102.

Suitable laser wavelengths for forming defects 172 are wavelengths at which the combined losses of linear absorption and scattering by the transparent workpiece 160 are sufficiently low. In embodiments, the combined losses due to linear absorption and scattering by the transparent workpiece 160 at the wavelength are less than 20%/mm, or less than 15%/mm, or less than 10%/mm, or less than 5%/mm, or less than 1%/mm, where the dimension "/mm" means per millimeter of distance within the transparent workpiece 160 in the beam propagation direction of the laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the laser beam 112 output by the beam source 110 may create multi-photon absorption (MPA) in the transparent workpiece 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the contour 170 (FIGS. 1A and 1B) may utilize the beam source 110 (e.g., a pulsed beam source such as an ultra-short pulse laser) in combination with the aspheric optical element 120, the first lens 130, and the second lens 132, to irradiate the transparent workpiece 160 and generate the laser beam focal line 113. The laser beam focal line 113 comprises a quasi-non-diffracting beam, such as a Gauss-Bessel beam or Bessel beam, as defined above, and may fully or partially perforate the transparent workpiece 160 to form defects 172 in the transparent workpiece 160, which may form the contour 170. In embodiments in which the laser beam 112 comprises a pulsed laser beam, the pulse duration of the individual pulses is in a range of from about 1 femtosecond to about 200 picoseconds, such as from about 1 picosecond to about 100 picoseconds, 5 picoseconds to about 20 picoseconds, or the like, and the repetition rate of the individual pulses may be in a range from about 1 kHz to 4 MHz, such as in a range from about 10 kHz to about 3 MHz, or from about 10 kHz to about 650 kHz.

Referring also to FIGS. 3A and 3B, in addition to a single pulse operation at the aforementioned individual pulse repetition rates, in embodiments comprising a pulsed laser beam, the pulses may be produced in pulse bursts 500 of two sub-pulses 500A or more (such as, for example, 3 sub-pulses, 4 sub-pulses, 5 sub-pulses, 10 sub-pulses, 15 sub-pulses, 20 sub-pulses, or more per pulse burst, such as from 1 to 30 sub-pulses per pulse burst 500, or from 5 to 20 sub-pulses per pulse burst 500). While not intending to be limited by theory, a pulse burst is a short and fast grouping of sub-pulses that creates an optical energy interaction with the material (i.e. MPA in the material of the transparent workpiece 160) on a time scale not easily accessible using a single-pulse operation. While still not intending to be limited by theory, the energy within a pulse burst (i.e. a group of pulses) is conserved. As an illustrative example, for a pulse burst having an energy of 100 µJ/burst and 2 sub-pulses, the 100 µJ/burst energy is split between the 2 pulses for an average energy of 50 µJ per sub-pulse and for a pulse burst having an energy of 100 µJ/burst and 10 sub-pulses, the 100 µJ/burst is split amongst the 10 sub-pulses for an average energy of 10 µJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent workpiece 160.

While still not intending to be limited by theory, when the defects 172 of the one or more contours 170 are formed with pulse bursts having at least two sub-pulses, the force necessary to separate the transparent workpiece 160 along the contour 170 (i.e. the maximum break resistance) is reduced compared to the maximum break resistance of a contour 170 with the same spacing between adjacent defects 172 in an identical transparent workpiece 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 3A and 3B, the sub-pulses 500A within the pulse burst 500 may be separated by a duration that is in a range from about 1 nsec to about 50 nsec, for example, from about 10 nsec to about 30 nsec, such as about 20 nsec. In other embodiments, the sub-pulses 500A within the pulse burst 500 may be separated by a duration of up to 100 psec (for example, 0.1 psec, 5 psec, 10 psec, 15 psec, 18 psec, 20 psec, 22 psec, 25 psec, 30 psec, 50 psec, 75 psec, or any range therebetween). For a given laser, the time separation $T_p$ (FIG. 4B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 3B) is about 5 microseconds for the beam source 110 outputting a laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from about 1 kHz to about 4 MHz. In embodiments, the laser burst repetition rates may be, for example, in a range of from about 10 kHz to 650 kHz. The time $T_b$ between the first pulse in each burst to the first pulse in the subsequent burst may be from about 0.25 microsecond (4 MHz burst repetition rate) to about 1000 microseconds (1 kHz burst repetition rate), for example from about 0.5 microseconds (2 MHz burst repetition rate) to about 40 microseconds (25 kHz burst repetition rate), or from about 2 microseconds (500 kHz burst repetition rate) to about 20 microseconds (50 k Hz burst repetition rate). The exact timing, pulse duration, and burst repetition rate may vary depending on the laser design, but short pulses ($T_d$<20 psec and, in some embodiments, $T_d$≤15 psec) of high intensity have been shown to work particularly well.

The burst repetition rate may be in a range of from about 1 kHz to about 2 MHz, such as from about 1 kHz to about 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent workpiece 160 being operated on such that the material of the transparent workpiece 160 is substantially transparent at the wavelength. The average laser power per burst measured at the material may be at least about 40 µJ per mm of thickness of material. For example, in embodiments, the average laser power per burst may be from about 40 µJ/mm to about 2500 µJ/mm, or from about 500 µJ/mm to about 2250 µJ/mm. In a specific example, for 0.5 mm to 0.7 mm thick Corning EAGLE XG® transparent workpiece, pulse bursts of from about 300 µJ to about 600 µJ may cut and/or separate the workpiece, which corresponds to an exemplary range of about 428 µJ/mm to about 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent workpiece 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from about 25 µJ to about 750 µJ, e.g., from about 50 µJ to about 500 µJ, or from about 50 µJ to about 250 µJ. For some glass compositions, the pulse energy (e.g., pulse burst energy) may be from about 100 µJ to about 250 µJ. However, for display or TFT glass compositions, the pulse energy (e.g., pulse burst energy) may be higher (e.g., from about 300 µJ to about 500 µJ, or from about 400 µJ to about 600 µJ, depending on the specific glass composition of the transparent workpiece 160).

While not intending to be limited by theory, the use of a laser beam 112 comprising a pulsed laser beam capable of generating pulse bursts is advantageous for cutting or modifying transparent materials, for example glass (e.g., the transparent workpiece 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating transparent workpiece 160 along the one or more contours 170, thereby minimizing unintended crack formation. Further, using a pulse burst to form defects 172 increases the randomness of the orientation of cracks extending outward from each defect 172 into the bulk material of the transparent workpiece 160 such that individual cracks extending outward from defects 172 do not influence or otherwise bias the separation of the contour 170 such that separation of the defects 172 follows the contour 170, minimizing the formation of unintended cracks.

Referring again to FIG. 2, the aspheric optical element 120 is positioned within the beam pathway 111 between the beam source 110 and the transparent workpiece 160. In operation, propagating the laser beam 112, e.g., an incoming Gaussian beam, through the aspheric optical element 120 may alter the laser beam 112 such that the portion of the laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens, a positive refractive axicon lens, a reflective axicon lens, a diffractive axicon lens, a programmable spatial light modulator axicon lens (e.g., a phase axicon), or the like.

In some embodiments, the aspheric optical element 120 comprises at least one aspheric surface whose shape is mathematically described as: $z'=(cr^2/1)+(1-(1+k)(c^2r^2))^{1/2}+(a_1r+a_2r^2+a_3r^3+a_4r^4+a_5r^5+a_6r^6+a_7r^7+a_8r^8+a_9r^9+a_{10}r^{10}+a_{11}r^{11}+a_{12}r^{12}$ where z' is the surface sag of the aspheric surface, r is the distance between the aspheric surface and the optical axis 102 in a radial direction (e.g., in an X-direction or a Y-direction), c is the surface curvature of the aspheric surface (i.e. $c_i=1/R_i$, where R is the surface radius of the aspheric surface), k is the conic constant, and coefficients $a_i$ are the first through the twelfth order aspheric coefficients or higher order aspheric coefficients (polynomial aspheres) describing the aspheric surface. In one example embodiment, at least one aspheric surface of the aspheric optical element 120 includes the following coefficients $a_1$-$a_7$, respectively: −0.085274788; 0.065748845; 0.077574995; −0.054148636; 0.022077021; −0.0054987472; 0.0006682955; and the aspheric coefficients $a_8$-$a_{12}$ are 0. In this embodiment, the at least one aspheric surface has the conic constant k=0. However, because the $a_1$ coefficient has a nonzero value, this is equivalent to having a conic constant k with a non-zero value. Accordingly, an equivalent surface may be described by specifying a conic constant k that is non zero, a coefficient $a_1$ that is non-zero, or a combination of a nonzero k and a non-zero coefficient $a_1$. Further, in some embodiments, the at least one aspheric surface is described or defined by at least one higher order aspheric coefficients $a_2$-$a_{12}$ with non-zero value (i.e., at least one of $a_2$, $a_3$ ..., $a_{12}$≠0)). In one example embodiment, the aspheric optical element 120 comprises a third-order aspheric optical element such as a cubically shaped optical element, which comprises a coefficient $a_3$ that is non-zero.

In some embodiments, when the aspheric optical element 120 comprises an axicon 122 (as depicted in FIG. 2), the axicon 122 may have a laser output surface 126 (e.g., conical surface) having an angle of about 1.2°, such as from about 0.5° to about 5°, or from about 1° to about 1.5°, or even from about 0.5° to about 20°, the angle measured relative to the laser input surface 124 (e.g., flat surface) upon which the laser beam 112 enters the axicon 122. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a waxicon, a spatial phase modulator such as a spatial light modulator, or a diffractive optical grating. In operation, the aspheric optical element 120 shapes the incoming laser beam 112 (e.g., an incoming Gaussian beam) into a quasi-non-diffracting beam, which, in turn, is directed through the first lens 130 and the second lens 132.

Referring still to FIG. 2, the first lens 130 is positioned upstream the second lens 132 and may collimate the laser beam 112 within a collimation space 134 between the first lens 130 and the second lens 132. Further, the second lens 132 may focus the laser beam 112 into the transparent workpiece 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Figure 4A:
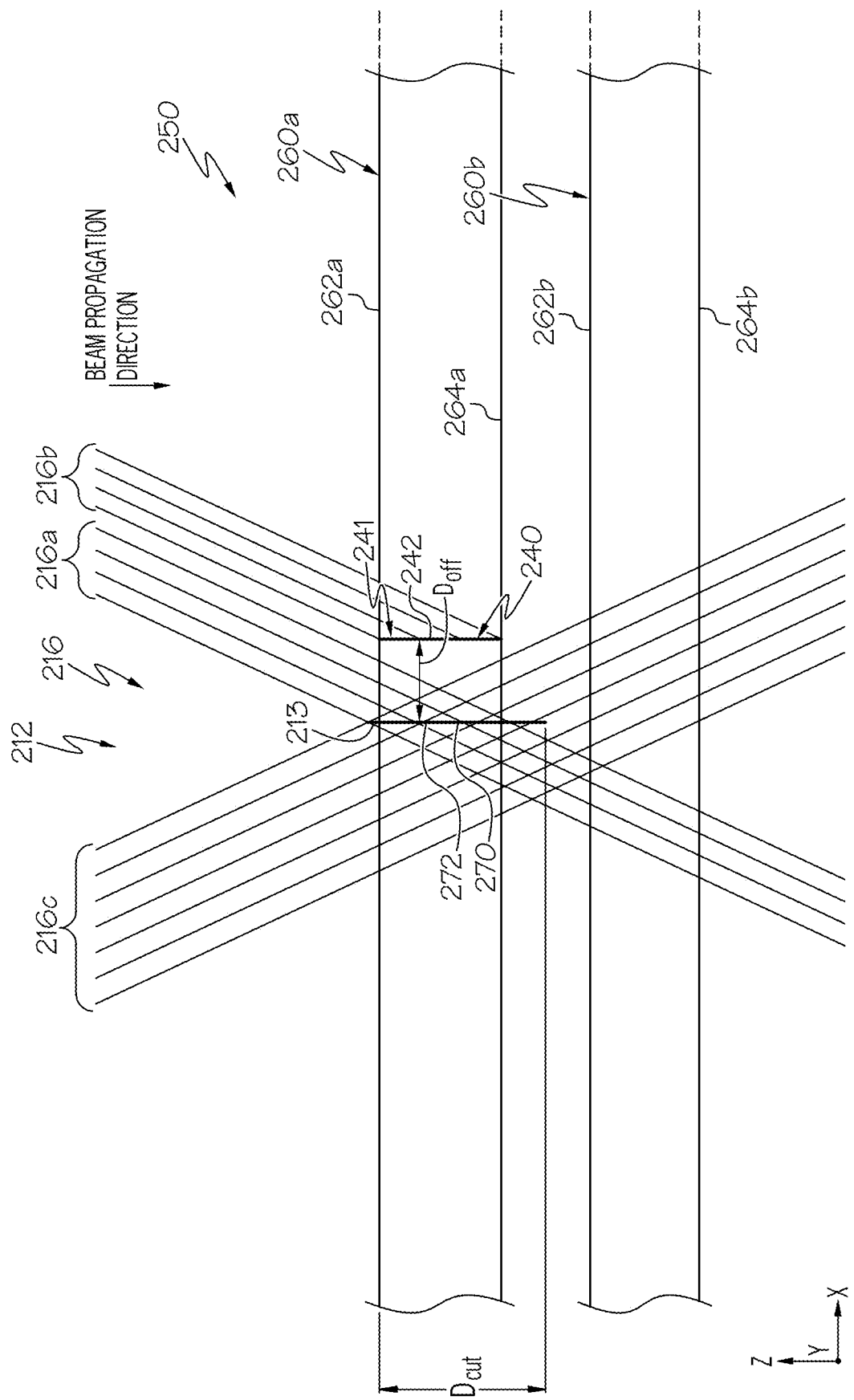
FIG. 4A schematically depicts selective formation of defects in a workpiece stack using a primary laser beam and an optically modified region comprising a modification track, according to one or more embodiments described herein.
Figure 4B:
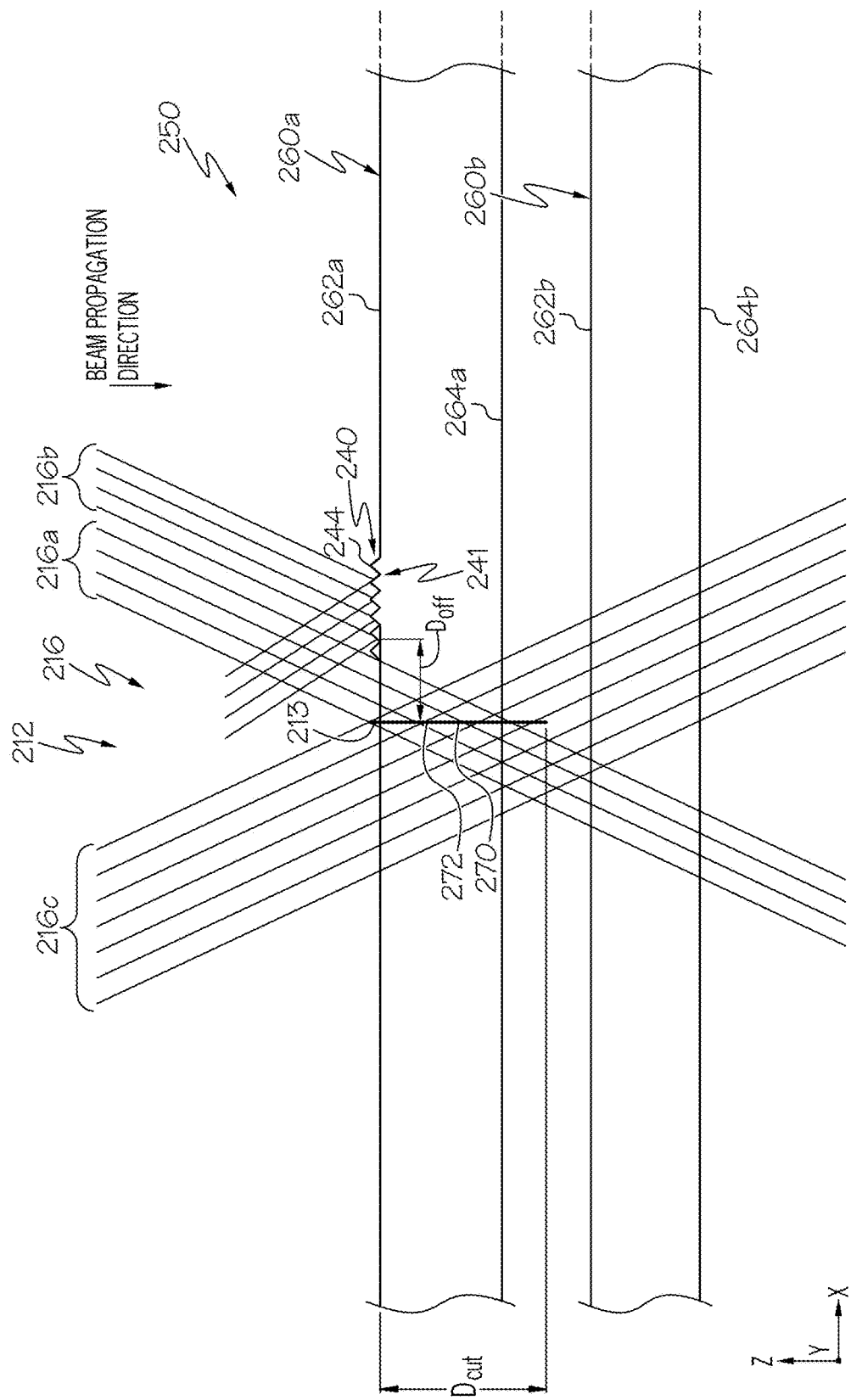
FIG. 4B schematically depicts selective formation of defects in a workpiece stack using a primary laser beam and an optically modified region comprising another modification track, according to one or more embodiments described herein.
Figure 4C:
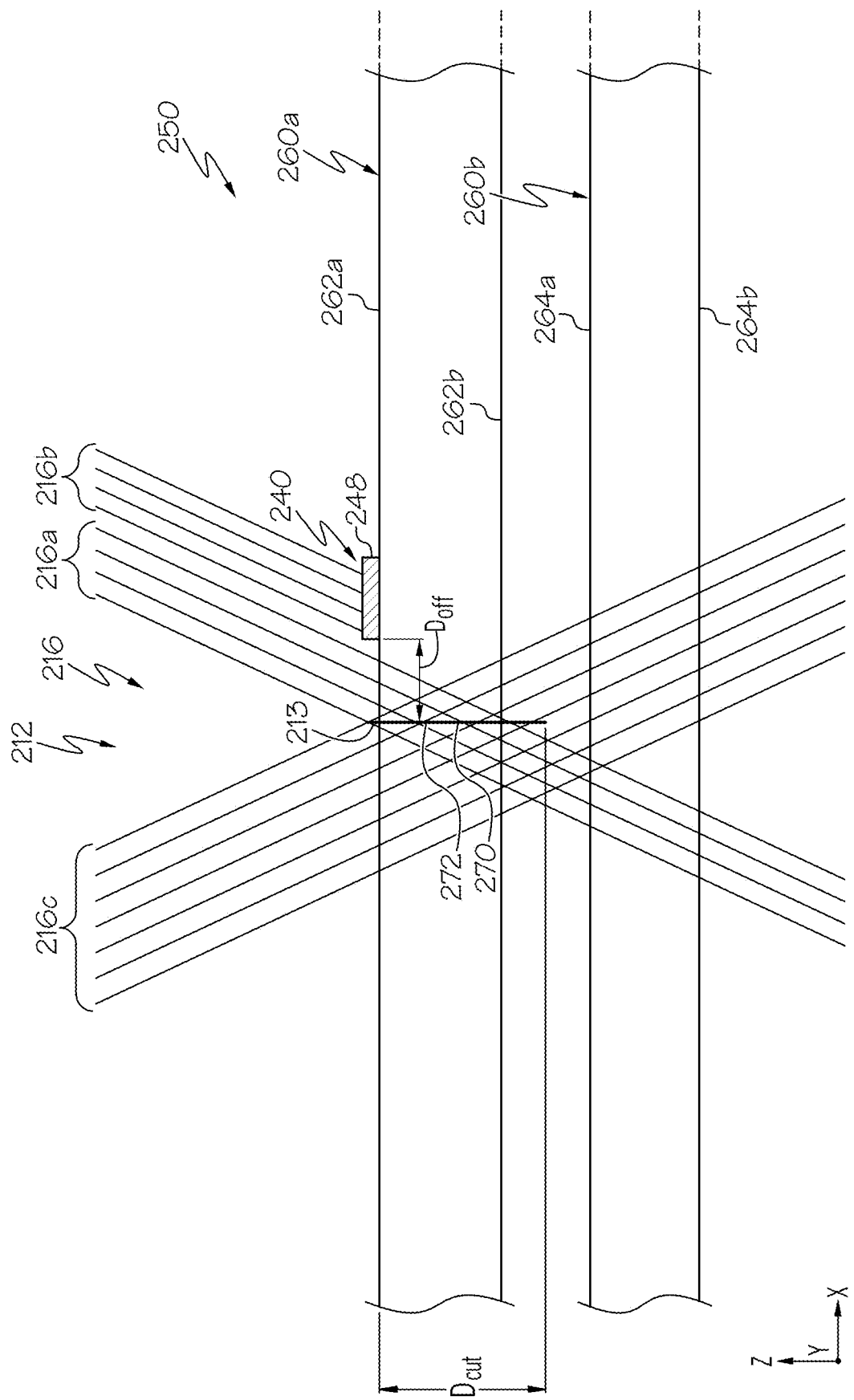
FIG. 4C schematically depicts selective formation of defects in a workpiece stack using a primary laser beam and an optically modified region comprising a disruptive material strip, according to one or more embodiments described herein.

Referring now to FIGS. 4A-4C, a workpiece stack 250 comprising a plurality of transparent workpieces 260, for example, a first transparent workpiece 260a and a second transparent workpiece 260b, is schematically depicted. The first transparent workpiece 260a and the second transparent workpiece 260b each comprise a first surface 262a, 262b opposite a second surface 264a, 264b. While not depicted, in some embodiments, the workpiece stack 250 may comprise additional layers, for example, transparent workpieces in addition to transparent workpieces 260a and 260b or other layers of material, such as resin layers, metallic or otherwise conductive layers, or the like. Further, in the embodiments of FIGS. 4A-4C, the first transparent workpiece 260a and the second transparent workpiece 260b are spaced apart and a gap is positioned therebetween, however, it should be understood that in some embodiments, the first transparent workpiece 260a may be in contact with the second transparent workpiece 260b. For example, the second surface 264a of the first transparent workpiece 260a may be in contact with the first surface 262b of the second transparent workpiece 260b.

Further, FIGS. 4A-4C depict methods of selectively laser processing the workpiece stack 250. In particular, FIGS. 4A-4C each depict an optically modified region 240 on or in the first transparent workpiece 260a. The optically modified region 240 is configured to modify wavefronts of a primary laser beam 212 (such as the quasi-non diffracting beam described above) that impinge the first transparent workpiece 260a. In operation, the optically modified region 240 may prevent the primary laser beam 212 from forming a laser beam focal line 213 sufficient to form a defect 272 in select portions of the workpiece stack 250, for example, in select portions of the first transparent workpiece 260a, in select portions of the second transparent workpiece 260b (such as the entire second transparent workpiece 260b, as depicted in FIGS. 4A-4C), or the like. Further, while the optically modified region 240 is primarily depicted and described herein as being formed in or disposed on the first transparent workpiece 260a, it should be understood the optically modified region 240 may be formed in or disposed on any transparent workpiece of the workpiece stack. For example, in a workpiece stack comprising three transparent workpieces, the optically modified region 240 may be as being formed in or disposed on the second transparent workpiece to prevent the primary laser beam 212 from forming a laser beam focal line 213 sufficient to form a defect 272 in the third transparent workpiece.

Referring still to FIGS. 4A-4C, the primary laser beam 212 comprises a quasi-non diffracting beam, which may be a pulsed laser beam or a continuous wave laser beam. The primary laser beam 212 may be focused into the laser beam focal line 213, as shown in FIGS. 4A-4C, for example, using an optical assembly such as the optical assembly 100 of FIG. 2, described above. Moreover, it should be understood that the primary laser beam 212 may comprise any of the embodiments of the laser beam 112 described above and the laser beam focal line 213 may comprise any of the embodiments of the laser beam focal line 113 described above. Further, FIGS. 4A-4C schematically depict a caustic 216 of the primary laser beam 212.

In operation, the optically modified region 240 may modify a portion of the caustic 216 thereby preventing the primary laser beam 212 from forming the laser beam focal line 213 sufficient to form a defect 272 in select portions of the workpiece stack 250. For example, the optically modified region 240 may, block, absorb, refract, diffract, reflect, scatter, phase alter, or otherwise modify a portion of the caustic 216. While not intending to by limited by theory, modifying wavefronts of portion of the caustic 216, may prevent constructive interference of that portion of the caustic 216 with the modified caustic portion with wavefronts of another portion of the caustic 216, thereby preventing formation of laser beam focal lines 213 using wavefronts the modified portion of the caustic 216 or lowering the intensity of laser beam focal lines 213 formed using wavefronts of the modified portion of the caustic 216, such that defects 272 are not formed in the corresponding regions of the workpiece stack 250. While not intending to be limited by theory, blocking, absorbing, refracting, diffracting, reflecting, scattering, or phase altering the wavefronts of one portion of the caustic 216 may prevent constructive interference of this modified portion of the caustic 216 with wavefronts of another portion of the caustic 216.

As depicted FIGS. 4A-4C the primary laser beam 212 is directed onto the first transparent workpiece 260a (e.g., onto the first surface 262a of the first transparent workpiece 260a) such that a first caustic portion 216a of the primary laser beam 212 is directed into the first transparent workpiece 260a, thereby generating an induced absorption within the first transparent workpiece 260a and producing a defect 272 (which may comprise any of the defects 172 described above) within the first transparent workpiece 260a. Further, a second caustic portion 216b of the primary laser beam 212 is modified by the optically modified region 240. Without intending to be limited by theory, the wavefronts of the first caustic portion 216a may interact (e.g., cross) with wavefronts of a third caustic portion 216c to form the laser beam focal line 213 and the wavefronts of the second caustic portion 216b are prevented from forming a portion of the laser beam focal line 213 sufficient to form a defect 272.

Referring now to FIGS. 4A and 4B, the optically modified region 240 may comprise a modification track 241 disposed in the first transparent workpiece 260a. In some embodiments, the modification track 241 may comprise a modified refractive index region 242 (FIG. 4A) extending into the first transparent workpiece 260a and in other embodiments, the modification track 241 may comprise a modified surface track 244 (FIG. 4B).

As depicted in FIG. 4A, the modified refractive index region 242 extends from the first surface 262a to the second surface 264a of the first transparent workpiece 260a. In other embodiments, the modified refractive index region 242 may be disposed in the first transparent workpiece 260a without extending the entire depth of the first transparent workpiece 260a. The modified refractive index region 242 comprises a different refractive index than the surrounding material of the first transparent workpiece 260a such that wavefronts that impinge the modified refractive index region 242 (e.g., wavefronts of the second caustic portion 216b) are modified (e.g., refracted and/or phase altered).

As depicted in FIG. 4B, the modified surface track 244 comprises a region of a surface (e.g., the first surface 262a) of a transparent workpiece (e.g., the first transparent workpiece 260a) comprising one or more surface features, such as surface roughness, sufficient to modify the wavefronts a laser beam, such as the primary laser beam 212. In some embodiments, the modified surface track 244 comprises a groove extending into the first surface 262a of the first transparent workpiece 260a, a roughened portion of the first surface 262a, or the like. The modified surface track 244 is sufficient to scatter or otherwise modify wavefronts of the second caustic portion 216b of the primary laser beam 212.

Moreover, as depicted in FIGS. 4A and 4B, at least of portion of the defect 272 extends below at least a portion of the optically modified region 240 (e.g., the modification track 241). In particular, the defect 272 extends within at least a portion of the first transparent workpiece 260, for example, from the first surface 262a to the second surface 264a of the first transparent workpiece 260a. Embodiments of the modification track 241 comprising the modified refractive index region 242 (FIG. 4A) and the modified surface track 244 (FIG. 4B) also extend into the first transparent workpiece 260a, however, a least a portion of the defect 272 (e.g., at least the portion farthest from the first surface 262a) extends below at least a portion of the modified refractive index region 242 and/or the modified surface track 244 (e.g., at least the portion of each nearest the first surface 262a). Further, it should be understood that the defects 272 also extend below at least a portion of the optically modified region 240 in embodiments in which the optically modified region 240 comprises a disruptive material strip 248 (FIG. 4C).

Referring now to FIG. 4C, in some embodiments, the optically modified region 240 may comprise a disruptive material strip 248 disposed on the first transparent workpiece 260a. In particular, the disruptive material strip 248 may be disposed on the first surface 262a of the first transparent workpiece 260a. In some embodiments, the disruptive material strip 248 may comprise an absorptive material, for example a colored or uncolored polymer configured to absorb a broad wavelength spectrum or a diffusing polymer having absorptive particles embedded in the diffusing polymer, for example, metals such as Cr, alumina, or the like, selected to absorb narrow wavelength spectrum. In some embodiments, the disruptive material strip 248 may comprise a reflective material, for example, reflective metals such as Cr, Cu, or the like. In some embodiments, the disruptive material strip 248 may comprise a scattering material, for example a polymer embedded with scattering particles such as metal TiO, $SiO_2$, air bubbles, ceramic particles, or the like. In some embodiments, the disruptive material strip 248 may comprise a phase altering material, for example, a transparent material configured to alter the phase of the wavefront of the portion of the caustic traversing through the disruptive material strip 248 (e.g., the second caustic portion 216b), for example any transparent material having a different refractive index than the first transparent workpiece 260a. In operation, wavefronts (e.g., the wavefronts of the second caustic portion 216b) that impinge the disruptive material strip 248 are blocked, absorbed, reflected, scattered, refracted, diffracted, phase altered, or otherwise modified to prevent these wavefronts (e.g., the wavefronts of the second caustic portion 216b) from forming a portion of the laser beam focal line 213 sufficient to form a defect 272.

Figure 5A:
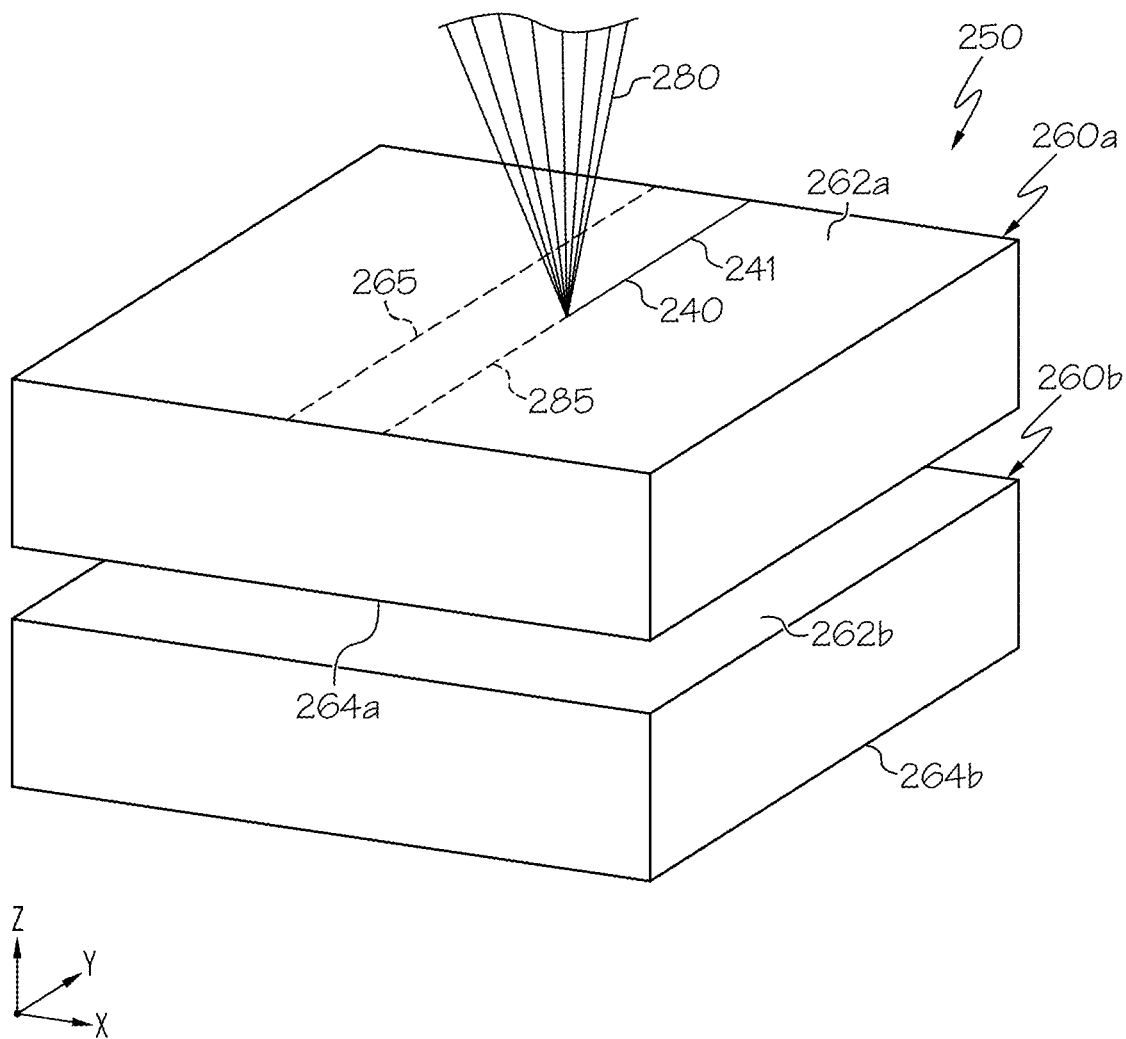
FIG. 5A schematically depicts laser formation of the modification track of FIGS. 4A and 4B, according to one or more embodiments shown and described herein.

Referring now to FIG. 5A, in some embodiments, forming the modification track 241 in the first transparent workpiece 260a comprises directing an auxiliary laser beam 280 onto the first transparent workpiece 260a such that the auxiliary laser beam 280 modifies at least a portion of the first transparent workpiece 260a and translating the first transparent workpiece 260a and the auxiliary laser beam 280 relative to each other along a modification line 285 thereby modifying the first transparent workpiece 260a along the modification line 285, forming the modification track 241. It should be understood that while FIG. 5A schematically a general modification track 241, the embodiments depicted in FIG. 5A may be used to from a modification track 241 comprising the one or more modified refractive index regions 242 of FIG. 4A or the modified surface track 244 of FIG. 4B.

In some embodiments, the auxiliary laser beam 280 comprises a quasi-non diffracting beam, such as the laser beam 112, which may be directed (e.g., focused) into the first transparent workpiece 260a to form one or more modified refractive index regions 242. For example, the auxiliary laser beam 280 may be formed into a laser beam focal line, similar to the laser beam focal lines 113, 213, and directed into the first transparent workpiece 260a to modify the refractive index of the first transparent workpiece 260a via an induced absorption process, as described above with respect to the laser beam focal line 113. Furthermore, the auxiliary laser beam 280 may comprise a lower laser power than the primary laser beam 212 to minimize unwanted alterations (e.g., damage) while still forming the one or more modified refractive index regions 242 of FIG. 4A. In some embodiments, the primary laser beam 212 and the auxiliary laser beam 280 may comprise a pulsed laser beam and may each comprise different pulse energies. For example, the primary laser beam 212 may comprise a first pulse energy, the auxiliary laser beam 280 may comprise a second pulse energy, and the first pulse energy may be greater than the second pulse energy. Further, in embodiments in which the auxiliary laser beam 280 comprises a pulsed laser beam, the modification track 241 may comprise a plurality of modified refractive index regions 242 and a spacing between adjacent modified refractive index regions 242 may be the same as the spacing between adjacent defects 272 of the contour 170 or may be different than the spacing between adjacent defects 272 of the contour 170. Moreover, in some embodiments, the auxiliary laser beam 280 may be used to form a modification track 241 that comprises a scattering center, e.g., a modified region extending into the first transparent workpiece 260a that is configured to scatter wavefronts, such as wavefronts of the second caustic portion 216b of the primary laser beam 212, which impinge the scattering center. In some embodiments, the modified refractive index regions 242 may operate as scattering centers and in other embodiments, the auxiliary laser beam 280 may modify the first transparent workpiece 260a to form a scattering center without modifying the refractive index of the first transparent workpiece 260a.

Referring still to FIG. 5A, in some embodiments, directing the auxiliary laser beam 280 onto the first transparent workpiece 260a ablates material from the first surface 262a of the first transparent workpiece 260a, to form the modified surface track 244. In some embodiments of forming the modified surface track 244 of FIG. 4B, the auxiliary laser beam 280 may comprise a continuous wave laser beam, such as an infrared laser beam, and in other embodiments, the auxiliary laser beam 280 may comprise a pulsed laser beam, for example, any of the pulsed laser beams described herein, having sufficient laser power to ablate material of the first transparent workpiece 260a. In some embodiments, ablating material from the first surface 262a of the first transparent workpiece 260a merely roughens portions of the first surface 262a and in other embodiments, ablating material from the first surface 262a of the first transparent workpiece 260a forms a groove extending into the first surface 262a.

Figure 5B:
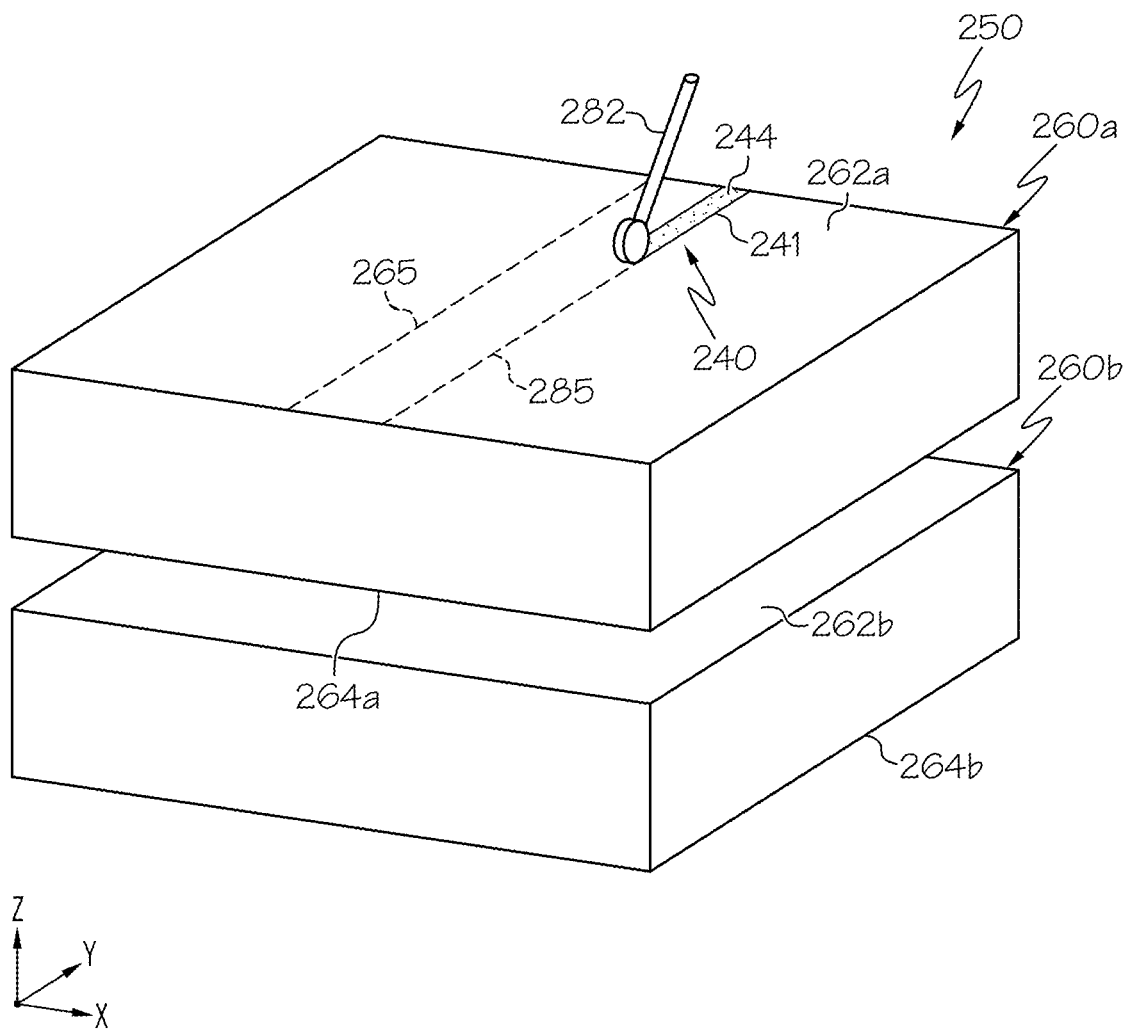
FIG. 5B schematically depicts mechanical formation of the modification track of FIGS. 4A and 4B, according to one or more embodiments shown and described herein.

Referring now to FIG. 5B, in some embodiments, the modified surface track 244 may be formed mechanically. For example, forming the modified surface track 244 comprises contacting the first surface 262a of the first transparent workpiece 260a with a mechanical surface modification element 282 and translating the first transparent workpiece 260a and the mechanical surface modification element 282 relative to each other along the modification line 285 thereby modifying the first surface 262a of the first transparent workpiece 260a along the modification line 285, forming the modified surface track 244. In some embodiments, the mechanical surface modification element 282 may comprise a grinding element (such as a grinding wheel), a scoring wheel, or the like. In some embodiments, the mechanical surface modification element 282 merely roughens portions of the first surface 262a and in other embodiments, the mechanical surface modification element 282 forms a groove extending into the first surface 262a.

Methods of processing transparent workpieces and transparent workpieces stacks will now be described with reference to the workpiece stack 250 of FIGS. 4A-5C. While methods are described herein with respect to the workpiece stack 250, it should be understood that the methods are applicable to a single transparent workpiece or to workpiece stacks having a variety of arrangements, such as additional transparent workpieces and other material layers.

Referring now FIGS. 4A-5C, a method of processing the workpiece stack 250 (or alternatively a single transparent workpiece) comprises forming the optically modified region 240 on or in the first transparent workpiece 260a and thereafter forming a contour 270 comprising a plurality of defects 272 in the first transparent workpiece 260a positioned laterally offset from the optically modified region 240. Forming the contour 270 comprises directing the primary laser beam 212 onto the first transparent workpiece 260a such that the first caustic portion 216a of the primary laser beam 212 is directed into the first transparent workpiece 260a, to form one or more defects 272 while the second caustic portion 216b of the primary laser beam 212 is modified (e.g., blocked, absorbed, reflected, scattered, refracted, diffracted, phase altered, or otherwise modified) by the optically modified region 240 (e.g., the modification track 241, such as the modified refractive index regions or the modified surface track 244, or the disruptive material strip 248). Forming the contour 270 further comprises translating the first transparent workpiece 260a and the primary laser beam 212 relative to each other along a contour line 265 and laterally offset from the optically modified region 240, such that the first caustic portion 216a laser forms defects 272 within the first transparent workpiece 260a at locations laterally offset from the optically modified region 240 while the second caustic portion 216b is modified by the optically modified region 240.

Referring still to FIGS. 4A-5C, the contour 270 may be laterally offset from the optically modified region 240 by an offset distance $D_{OFF}$. While not intending to be limited by theory, the primary laser beam 212, e.g., the caustic 216 of the primary laser beam 212, impinges the first surface 262a of the first transparent workpiece 260a at an approach angle α and the optically modified region 240 disrupts the formation of the laser beam focal line 213 at a distance $D_{om}$-downstream the first surface 262a of the first transparent workpiece 260a (e.g., below the first surface 262a in the Z direction), where $D_{OFF}=D_{CUT}$ tan α. While not intending to be limited by theory, in embodiments in which the optically modified region 240 comprises a modified surface track 244 or a disruptive material strip 248, the width W (measured in the in the lateral offset direction) of the modified surface track 244 or the disruptive material strip 248 along the first surface 262a of the first transparent workpiece 260a may control the length L (measured in the beam propagation direction) of interruption of the formation of a laser beam focal line 213 sufficient to form defects 272 in the workpiece stack 250, where W=L tan α.

In some embodiments, the first transparent workpiece 260a of the workpiece stack 250 may be further acted upon in a subsequent separating step to induce separation of the transparent workpiece 160 along the contour 170, for example, any of the separating steps described above with respect to FIGS. 1A and 1B. Further, when one of the separated portions of the first transparent workpiece 260a are scrap portions, it may be advantageous to form the optically modified region(s) 240 in or on portions of the first transparent workpiece 260a that are scrapped after separation, particularly in embodiments in which the optically modified region(s) 240 comprise modification track(s) 241.

Referring now to FIGS. 4A, 4B, 5A, and 5B, while a single optically modified region 240 is depicted, multiple optically modified regions 240 are contemplated. For example, the optically modified region 240 may comprise a first optically modified region and the method may further comprise forming a second optically modified region in the first transparent workpiece 260a. In some embodiments, the second optically modified region may be positioned laterally offset from the first optically modified region such that the first optically modified region is disposed between the contour 270 and the second optically modified region. This embodiment may facilitate formation of a laser beam focal line 213 having multiple segments spaced apart in the Z direction (e.g., in a beam propagation direction of the primary laser beam 212), thereby facilitating formation of a grating in the workpiece stack 250, for example, in the first transparent workpiece 260a, in the second transparent workpiece 260b, or in both. In other embodiments, the second optically modified region may be positioned laterally offset from the contour 270 such that the contour 270 is disposed between the first optically modified region and the second optically modified region. In this embodiment, the first optically modified region (e.g., the optically modified region 240) may disrupt the second caustic portion 216b of the primary laser beam 212 and the second optically modified region may modify at least some of the wavefronts of the third caustic portion 216c, further limiting wavefronts of the primary laser beam 212 from generating induced absorption in certain portions of the workpiece stack (e.g., in the second transparent workpieces 260b in the examples depicted in FIGS. 4A and 4B).

Referring now to FIGS. 4A, 4B, 5A, and 5B, in some embodiments, the optically modified region 240 comprises the modification track 241 formed in the first transparent workpiece 260a. In some embodiments, as depicted in FIG. 5A, forming the modification track 241 in the first transparent workpiece 260a comprises directing the auxiliary laser beam 280 onto the first transparent workpiece 260a and translating the first transparent workpiece 260a and the auxiliary laser beam 280 relative to each other (and in some embodiments the workpiece stack 250 and the auxiliary laser beam 280) along a modification line 285 thereby modifying the first transparent workpiece 260a along the modification line 285, forming the modification track 241. As described above, the auxiliary laser beam 280 may form the modified refractive index regions 242 (FIG. 4A) or the modified surface track 244 (FIG. 4B). In some embodiments, as depicted in FIG. 5B, forming the modification track 241 in the first transparent workpiece 260a comprises contacting the first surface 262a of the first transparent workpiece 260a with the mechanical surface modification element 282 and translating the first transparent workpiece 260a and the mechanical surface modification element 282 relative to each other along the modification line 285 to grind, score, roughen, or otherwise modify the first surface 262a of the first transparent workpiece 260a along the modification line 285, forming the modified surface track 244.

Figure 5C:
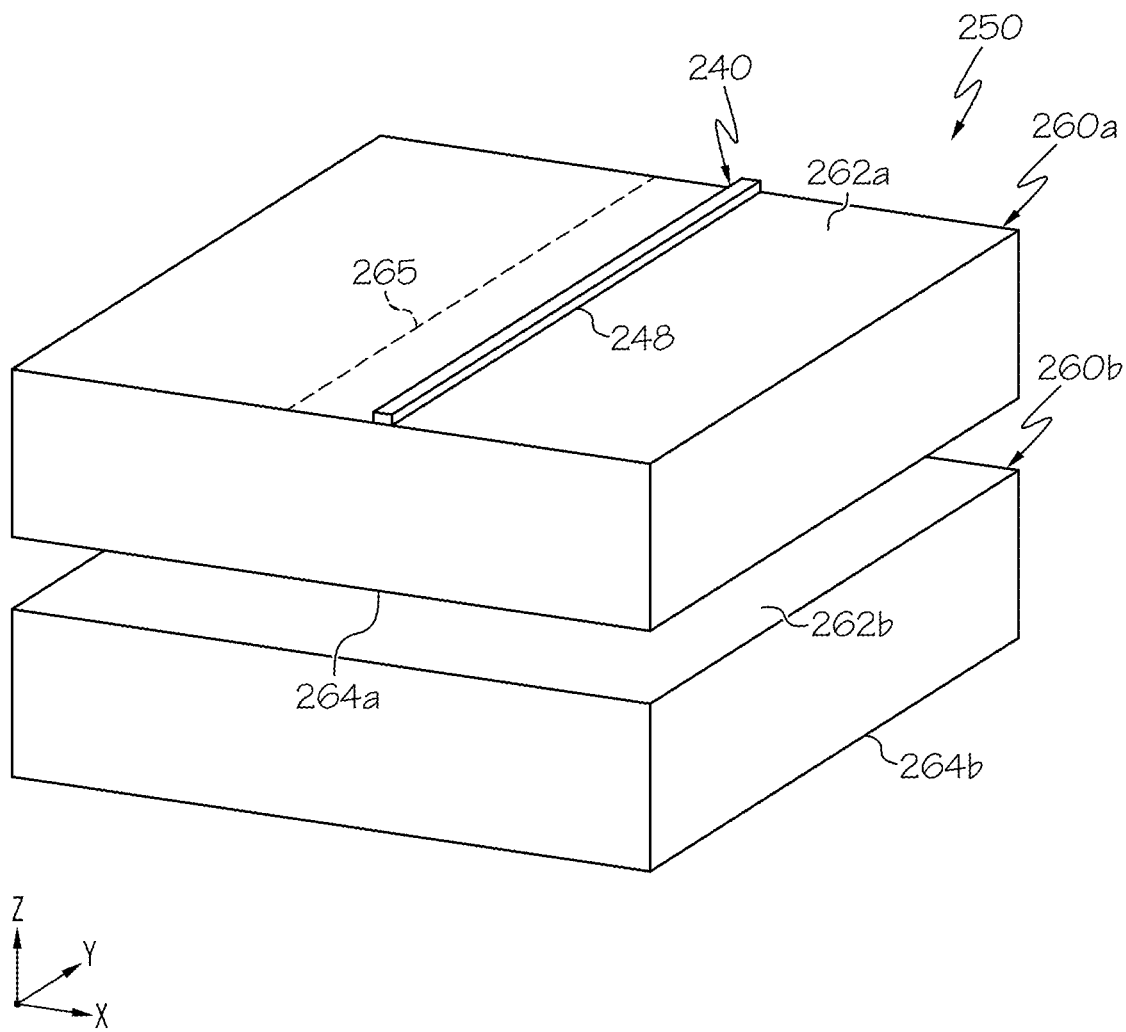
FIG. 5C schematically depicts the disruptive material strip disposed on a workpiece stack, according to one or more embodiments shown and described herein.

Referring now FIGS. 4C and 5C, in some embodiments, the optically modified region 240 comprises the disruptive material strip 248 and forming the optically modified region 240 may comprise depositing the disruptive material strip 248 on the first surface 262a of the first transparent workpiece 260a.

Figure 6A:
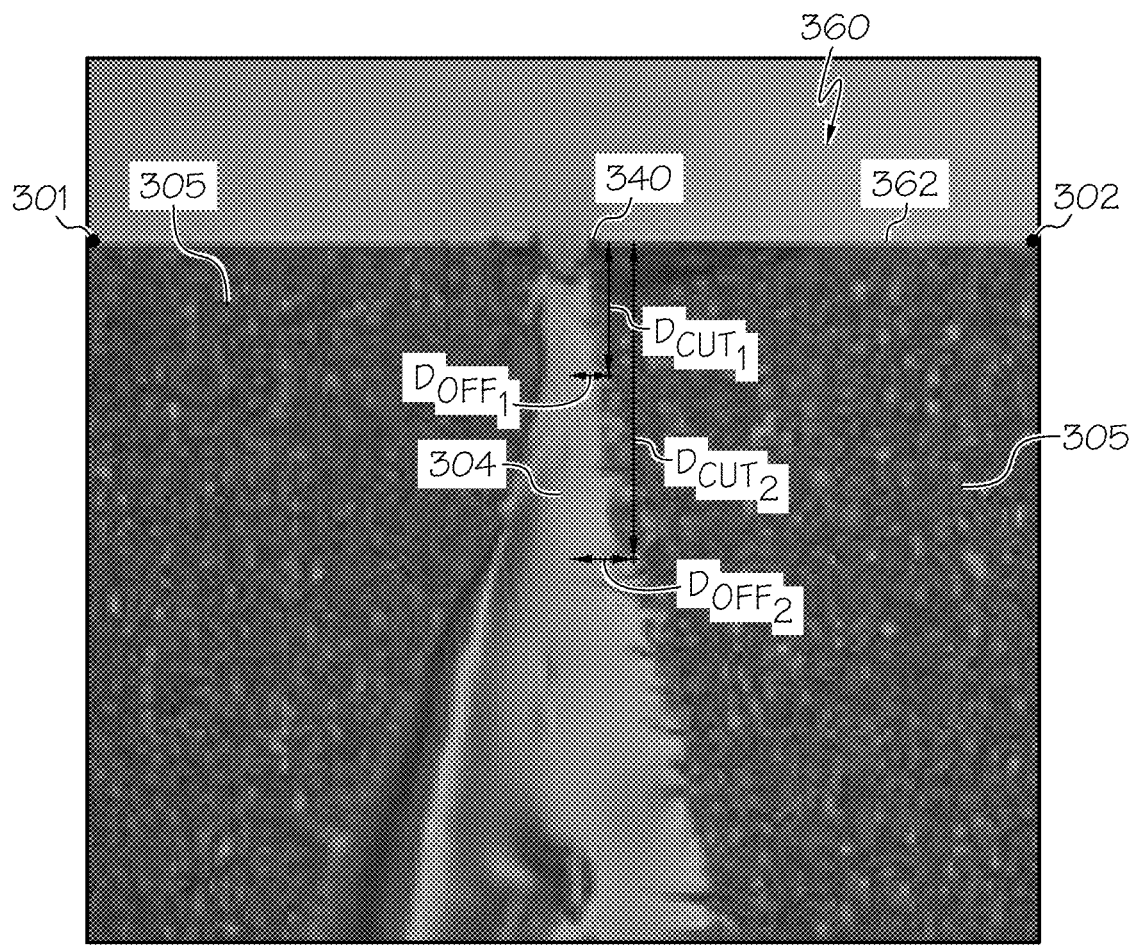
FIG. 6A is an image of a transparent workpiece having an optically modified region, according to one or more embodiments shown and described herein.
Figure 6B:
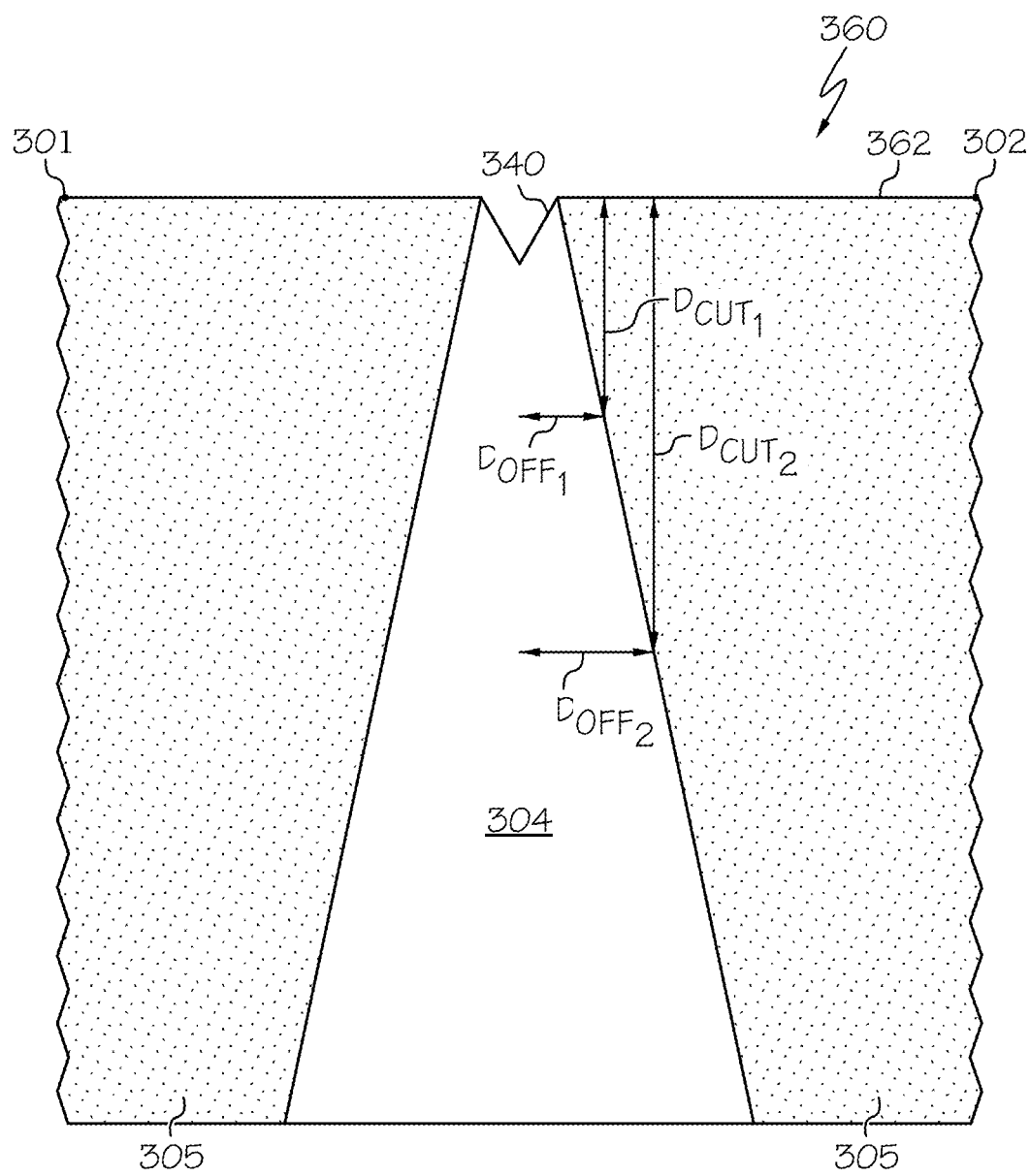
FIG. 6B is schematic depiction of the transparent workpiece of FIG. 6A, according to one or more embodiments shown and described herein.

Referring now to FIGS. 6A and 6B, an image of an example transparent workpiece 360 (FIG. 6A) and a schematic depiction of the transparent workpiece 360 (FIG. 6B), are shown. An optically modified region 340 is disposed in the first surface 362 of the transparent workpiece 360. Further, the transparent workpiece 360 comprises altered material portions 305 and an unaltered material portion 304. The altered material portions 305 are formed by directing a laser beam into the transparent workpiece at one of a first location 301 or a second location 302 and scanning the laser beam from one of the first location 301 or the second location 302 to the other of the first location 301 and the second location 302. However, during this scan, the optically modified region 340 modifies a portion of the laser beam and prevents the laser beam from altering a portion of the transparent workpiece 360 to form to unaltered material portion 304.

In the embodiments of FIGS. 5A to 5C, the contour line 265 is parallel to and offset from modification line 285. FIGS. 6A and 6B are different—in FIGS. 6A and 6B, the contour line runs from left to right, perpendicular to the modification line, which is normal to the page surface. The embodiment of FIGS. 6A and 6B is not designed to achieve a contour with uniform Dcut along the contour, but rather to illustrate the dependence of Dcut on Doff. For example, as Doff increases from Doff' to $Doff_2$, Dcut increases from Dcut' to $Dcut_2$. So, with reference to FIG. 5A for example, using the same laser and optically modified region used for FIGS. 6A and 6B, a contour that extends Dcut' into first transparent workpiece 260a uniformly along a contour may be achieved by setting the distance between contour line 265 and modification line 285 at $Doff_1$, and a contour that extends $Dcut_2$ into first transparent workpiece 260a uniformly along a contour may be achieved by setting the distance between contour line 265 and modification line 285 at $Doff_2$.

In view of the foregoing description, it should be understood that forming and selective laser processing of transparent workpieces and workpiece stacks may be enhanced by modifying wavefronts of a caustic portion of a laser beam used to form a contour of defects, for example, by using an optically modified region (e.g., a modification track and/or a disruptive material layer) positioned laterally offset from the contour. The optically modified region may modify wavefronts of one or more caustic portions of a laser beam to selectively prevent formation of defect in portions of a transparent workpiece or workpiece stack. For example, modifying wavefronts of a caustic portion of the laser beam allows a first transparent workpiece of a workpiece stack to be laser processed and separated without damaging a second transparent workpiece of the workpiece stack. Furthermore, the methods described herein facilitate selective laser processing without sensors, fast shift focusing optics, or other extraneous equipment.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing a transparent workpiece, the method comprising:
    forming an optically modified region in or on a transparent workpiece; and
    forming a contour in the transparent workpiece, the contour comprising a plurality of defects in the transparent workpiece positioned laterally offset from the optically modified region, wherein forming the contour comprises:
        directing a primary laser beam comprising a quasi-non diffracting beam oriented along a beam pathway onto the transparent workpiece such that:
            a first caustic portion of the primary laser beam is directed into the transparent workpiece, thereby generating an induced absorption within the transparent workpiece, the induced absorption producing a defect within the transparent workpiece, at least of portion of the defect extending below at least a portion of the optically modified region; and
            a second caustic portion of the primary laser beam is modified by the optically modified region;
        wherein the quasi-non diffracting beam comprises:
            a wavelength $\lambda$;
            a spot size $w_o$; and
            a cross section that comprises a Rayleigh range $Z_R$ that is greater than $$F_D \frac{\pi w_0^2}{\lambda},$$

where $F_D$ is a dimensionless divergence factor comprising a value of 10 or greater; and
    translating the transparent workpiece and the primary laser beam relative to each other along a contour line and laterally offset from the optically modified region.

2. The method of claim 1, wherein the optically modified region comprises a modification track formed in the transparent workpiece.

3. The method of claim 2, wherein forming the modification track in the transparent workpiece comprises:
    directing an auxiliary laser beam onto the transparent workpiece such that the auxiliary laser beam modifies at least a portion of the transparent workpiece; and
    translating the transparent workpiece and the auxiliary laser beam relative to each other along a modification line thereby modifying the transparent workpiece along the modification line, forming the modification track.

4. The method of claim 3, wherein:
    the auxiliary laser beam and the primary laser beam each comprise a pulsed laser beam;
    the primary laser beam comprises a first pulse energy and the auxiliary laser beam comprises a second pulse energy; and
    the first pulse energy is greater than the second pulse energy.

5. The method of claim 4, wherein:
    directing the auxiliary laser beam onto the transparent workpiece modifies a refractive index of at least a portion of the transparent workpiece; and
    translating the transparent workpiece and the auxiliary laser beam relative to each other along the modification line generates modified refractive index regions within the transparent workpiece, forming the modification track.

6. The method of claim 3, wherein directing the auxiliary laser beam onto the transparent workpiece ablates material from a first surface of the transparent workpiece.

7. The method of claim 2, wherein forming the modification track in the transparent workpiece comprises:
    contacting a first surface of the transparent workpiece with a mechanical surface modification element; and
    translating the transparent workpiece and the mechanical surface modification element relative to each other along a modification line thereby modifying the first surface of the transparent workpiece along the modification line, forming the modification track.

8. The method of claim 7, wherein the mechanical surface modification element comprises a grinding element or a scoring wheel.

9. The method of claim 1, wherein the optically modified region comprises a disruptive material strip deposited on a first surface of the transparent workpiece.

10. The method of claim 9, wherein the disruptive material strip comprises an absorptive material, a reflective material, a scattering material, or a phase altering material.

11. The method of claim 1, wherein:
    the optically modified region comprises a first optically modified region and the method further comprises forming a second optically modified region on or in the transparent workpiece; and the second optically modified region is positioned laterally offset from the first optically modified region such that the first optically modified region is disposed between the contour line and the second optically modified region.

12. The method of claim 1, wherein:
the optically modified region comprises a first optically modified region and the method further comprises forming a second optically modified region in the transparent workpiece; and
the second optically modified region is positioned laterally offset from the contour line such that the contour line is disposed between the first optically modified region and the second optically modified region.

13. The method of claim 1, wherein:
the primary laser beam impinges a first surface of the transparent workpiece at an approach angle $\alpha$;
the optically modified region is laterally offset from the contour line by an offset distance $D_{OFF}$; and
the optically modified region disrupts the formation of a laser beam focal line at a distance $D_{CUT}$ downstream the first surface of the transparent workpiece, wherein $D_{OFF} = D_{CUT} \tan \alpha$.

14. The method of claim 1, wherein the primary laser beam is directed through one or more lenses along the beam pathway such that the first caustic portion of the primary laser beam is directed into the transparent workpiece and forms a laser beam focal line within the transparent workpiece, wherein the laser beam focal line generates the induced absorption within the transparent workpiece, the induced absorption producing the defects within the transparent workpiece.

15. The method of claim 14, wherein at least one of the one or more lenses comprises an aspheric optical element.

16. The method of claim 1, wherein:
the dimensionless divergence factor $F_D$ comprises a value of from about 10 to about 2000; and
a spacing between adjacent defects is about 50 µm or less.

17. The method of claim 1, wherein the primary laser beam comprises a pulsed laser beam output by a beam source that produces pulse bursts comprising 2 sub-pulses per pulse burst or more.

18. The method of claim 1, wherein:
the transparent workpiece comprises a first transparent workpiece of a workpiece stack, the workpiece stack further comprising a second transparent workpiece;
the optically modified region is formed in or on the first transparent workpiece; and
forming the contour in the first transparent workpiece, laterally offset from the optically modified region, comprises:
directing the primary laser beam comprising the quasi-non diffracting beam oriented along the beam pathway onto the first transparent workpiece such that:
the first caustic portion of the primary laser beam is directed into the first transparent workpiece; and
the second caustic portion of the primary laser beam is modified by the optically modified region, thereby preventing the primary laser beam from generating an induced absorption within the second transparent workpiece.

19. A method for processing a transparent workpiece, the method comprising:
forming a modification track in a transparent workpiece; and
forming a contour in the transparent workpiece, the contour comprising a plurality of defects in the transparent workpiece positioned laterally offset from the modification track, wherein forming the contour comprises:
directing a primary laser beam comprising a quasi-non diffracting beam oriented along a beam pathway onto the transparent workpiece such that:
a first caustic portion of the primary laser beam is directed into the transparent workpiece, thereby generating an induced absorption within the transparent workpiece, the induced absorption producing a defect within the transparent workpiece, at least of portion of the defect extending below at least a portion of the modification track; and
a second caustic portion of the primary laser beam is modified by the modification track;
wherein:
the quasi-non diffracting beam comprises:
a wavelength $\lambda$;
a spot size $w_o$; and
a cross section that comprises a Rayleigh range $Z_R$ that is greater than $$F_D \frac{\pi w_0^2}{\lambda},$$

where $F_D$ is a dimensionless divergence factor comprising a value of 10 or greater; and
the primary laser beam comprises a pulsed laser beam output by a beam source that produces pulse bursts comprising 2 sub-pulses per pulse burst or more; and
translating the transparent workpiece and the primary laser beam relative to each other along a contour line and laterally offset from the modification track.

20. A method for processing a transparent workpiece, the method comprising:
depositing a disruptive material strip on a first surface of a transparent workpiece; and
forming a contour in the transparent workpiece, the contour comprising a plurality of defects in the transparent workpiece positioned laterally offset from the disruptive material strip, wherein forming the contour comprises:
directing a primary laser beam comprising a quasi-non diffracting beam oriented along a beam pathway onto the transparent workpiece such that:
a first caustic portion of the primary laser beam is directed into the transparent workpiece, thereby generating an induced absorption within the transparent workpiece, the induced absorption producing a defect within the transparent workpiece; and
a second caustic portion of the primary laser beam is modified by the disruptive material strip;
wherein:
the quasi-non diffracting beam comprises:
a wavelength $\lambda$;
a spot size $w_o$; and
a cross section that comprises a Rayleigh range $Z_R$ that is greater than $$F_D \frac{\pi w_0^2}{\lambda},$$

where $F_D$ is a dimensionless divergence factor comprising a value of 10 or greater; and the primary laser beam comprises a pulsed laser beam output by a beam source that produces pulse bursts comprising 2 sub-pulses per pulse burst or more; and translating the transparent workpiece and the primary laser beam relative to each other along a contour line and laterally offset from the disruptive material strip.

\* \* \* \* \*

UNITED STATES PATENT AND TRADEMARK OFFICE
CERTIFICATE OF CORRECTION

| | | |
|---|---|---|
| PATENT NO. | : 11,401,195 B2 | Page 1 of 1 |
| APPLICATION NO. | : 16/362110 | |
| DATED | : August 2, 2022 | |
| INVENTOR(S) | : Uwe Stute | |

It is certified that error appears in the above-identified patent and that said Letters Patent is hereby corrected as shown below:

On the Title Page

On the page 2, in Column 2, Item (56) under "Other Publications", Line 2, delete "(1997." and insert -- (1997). --.

On the page 2, in Column 2, Item (56) under "Other Publications", Line 4, delete "(1990." and insert -- (1990). --.

Signed and Sealed this
Twenty-second Day of November, 2022

Katherine Kelly Vidal
*Director of the United States Patent and Trademark Office*